(12) United States Patent
Whitley, Jr.

(10) Patent No.: US 10,049,135 B2
(45) Date of Patent: Aug. 14, 2018

(54) METHOD AND APPARATUS FOR CONTEXT BASED DATA ANALYTICS

(71) Applicant: Ronald Gordon Whitley, Jr., Glen Allen, VA (US)

(72) Inventor: Ronald Gordon Whitley, Jr., Glen Allen, VA (US)

( * ) Notice: Subject to any disclaimer, the term of this patent is extended or adjusted under 35 U.S.C. 154(b) by 527 days.

(21) Appl. No.: 14/551,974

(22) Filed: Nov. 24, 2014

(65) Prior Publication Data

US 2015/0149455 A1 May 28, 2015

Related U.S. Application Data

(60) Provisional application No. 61/907,813, filed on Nov. 22, 2013.

(51) Int. Cl.
*G06F 17/30* (2006.01)

(52) U.S. Cl.
CPC .... *G06F 17/30483* (2013.01); *G06F 17/3053* (2013.01); *G06F 17/3056* (2013.01); *G06F 17/30539* (2013.01); *G06F 17/30572* (2013.01)

(58) Field of Classification Search
None
See application file for complete search history.

(56) References Cited

U.S. PATENT DOCUMENTS

| | | | | |
|---|---|---|---|---|
| 2007/0198223 A1* | 8/2007 | Ella | ................... | G06Q 50/06 702/188 |
| 2011/0258049 A1* | 10/2011 | Ramer | ............. | G06F 17/30867 705/14.66 |
| 2011/0261049 A1* | 10/2011 | Cardno | ................. | G06Q 10/10 345/419 |

* cited by examiner

*Primary Examiner* — Wilson Lee
(74) *Attorney, Agent, or Firm* — Staas & Halsey LLP

(57) ABSTRACT

Context-based data analytics based on visual intuition, and generation of information contexts for conducting research, analysis, and/or decision making. A plurality of information objects (IOs) are generated, each IO indicative of a plurality of data points corresponding to an object among objects for which information in a first domain is obtained, by containing information values (IVs) based upon context data, an IV generated based upon a product of each target data point, a relevance value (RV) of the target data point, a confidence value (CV) of the target data point, and a bias value. Visually displaying the IVs in a three dimensional space based on a distance formula to represent a relative relationship indicative of relevance as gravitational forces between the IOs using a set of concentric spheres corresponding to the IOs.

5 Claims, 14 Drawing Sheets

| 402 | 404 | 406 | 408 | 410 | 412 | 414 | 416 |
|---|---|---|---|---|---|---|---|
| IAOB | | | | | | | |
| IC Number | IC Metric | $IV_{Input}$ | $RV_{IV}$ | $CV_{IV, RV}$ | IV | Bias | Bias-charge |
| 1 | Distance | 20 | 5% | 1 | 1 | Negative | -1 |
| 2 | Salary | $50,000 | 70% | 1 | 35000 | Positive | 1 |
| 3 | Benefits | Good | 20% | 1 | .2(Good) | Positive | 1 |
| 4 | Hours | 40 | 5% | 1 | 0.5 | Negative | -1 |

| 418 | 420 | 422 | 424 | 426 | 428 | 430 | 432 | 434 | 436 | 438 |
|---|---|---|---|---|---|---|---|---|---|---|
| IAO1 | | | | | | | | | | |
| $IV_{Input}$ | $RV_{IV}$ | $CV_{IV}$ | IV | $LI_{Mass}$ | $LI_{Size}$ | $LI_{Volume}$ | $LI_{Density}$ | $LI_{Density}$ Rank | Context layer rank | Context layer |
| 20 | 0.05 | 1 | 1 | 1 | 1 | 4.1888 | 0.239 | 1 | 3 | 0.75 |
| $50,000 | 0.7 | 1 | 35000 | 1 | 1 | 4.1888 | 0.239 | 1 | 1 | 0.25 |
| Good | 0.2 | 1 | .2(Good) | 1 | 1 | 4.1888 | 0.239 | 1 | 2 | 0.5 |
| 40 | 0.05 | 1 | 2 | 1 | 1 | 4.1888 | 0.239 | 1 | 4 | 1 |
| | | | | 4 | 4 | | 1.000 | | | |

| IAO2 | | | | | | | | | | |
|---|---|---|---|---|---|---|---|---|---|---|
| $IV_{Input}$ | $RV_{IV}$ | $CV_{IV}$ | IV | $LI_{Mass}$ | $LI_{Size}$ | $LI_{Volume}$ | $LI_{Density}$ | $LI_{Density}$ Rank | Context layer rank | Context layer |
| 25 | 0.05 | 1 | 0.8 | 0.8 | 1 | 4.1888 | 0.191 | 4 | 4 | 1 |
| 75000 | 0.7 | 1 | 52500 | 1.5 | 1 | 4.1888 | 0.358 | 1 | 1 | 0.25 |
| Good | 0.2 | 1 | 0.2(Good) | 1 | 1 | 4.1888 | 0.239 | 2 | 2 | 0.5 |
| 45 | 0.05 | 1 | 0.44444 | 0.88889 | 1 | 4.1888 | 0.212 | 3 | 3 | 0.75 |
| | | | | 4.18889 | 4 | | 1.047 | | | |

| IAO3 | | | | | | | | | | |
|---|---|---|---|---|---|---|---|---|---|---|
| $IV_{Input}$ | $RV_{IV}$ | $CV_{IV}$ | IV | $LI_{Mass}$ | $LI_{Size}$ | $LI_{Volume}$ | $LI_{Density}$ | $LI_{Density}$ Rank | Context layer rank | Context layer |
| 32 | 0.05 | 1 | 0.625 | 0.625 | 1 | 4.1888 | 0.149 | 4 | 4 | 1 |
| 60000 | 0.7 | 1 | 42000 | 1.2 | 1 | 4.1888 | 0.286 | 2 | 2 | 0.5 |
| Great | 0.2 | 1 | 1.33333 | 1.33333 | 1 | 4.1888 | 0.318 | 1 | 1 | 0.25 |
| 42 | 0.05 | 1 | 0.47619 | 0.95238 | 1 | 4.1888 | 0.227 | 3 | 3 | 0.75 |
| | | | | 4.11071 | 4 | | 1.028 | | | |

1. Bias-charge represents a value between -1 and 1 used to align Information Value with changes in the underlying data value
2. $IV_{Input}$ = the input Information Value
3. $RV_{IV}$ = the relative importance of each IC (in %)
4. $CV_{IV, RV}$ = the confidence level assessed with $IV_{Input}$ and $RV_{IV}$ (in %); there is no explicit entry for the $CV_{IV, RV}$, thus, the system default (100%) is used
5. IVScaled = the Information Value as the quantified approximation value of a qualitative value, as obtained from the user's Context Map within the user's Context Profile
6. IV = the Information Value as calculated as $(IV_{Input} * RV_{IV} * CV_{IV, RV})^{Bias-charge}$ for quantitative values, and as $(IV_{Scaled} * RV_{IV} * CV_{IV, RV})^{Bias-charge}$ for qualitative values, where $IV_{Scaled}$ = the quantified approximation value of a qualitative value generally determined as a key-value association, and Bias-charge = the user bias reflected in the information context and represents the relationship between the changes in $IV_{Input}$ and the intended impact to Information Value in the form of a positive or negative relationship
7. $LI_{Mass}$ = the Information Value relative to the base Information Value and calculated as $ICIV_i/ICIV_B$, where $ICIV_i$ = the IV in $IC_i$ in Fig. 4, $ICIV_B$ = IV in $IC_B$
9. $LI_{Volume}$ = the spatial volume occupied by $ICO_i$, where $ICO_i$ = the object representing $IC_i$, and calculated as $(4/3) * \pi * ICLI_{Size}^3$ where $ICLI_{Size}$ = the $LI_{Size}$ of $IC_i$, or radius = 1
10. $LI_{Density}$ = the units of IV per Unit of $LI_{Volume}$ and calculated as $LI_{Mass}/LI_{Volume}$

Fig. 4

METHOD AND APPARATUS FOR CONTEXT BASED DATA ANALYTICS

CROSS-REFERENCE TO RELATED APPLICATIONS

This application is based upon and claims priority to prior U.S. Provisional Patent Application No. 61/907,813 filed on Nov. 22, 2013 in the US Patent and Trademark Office, the entire contents of which are incorporated herein by reference.

FIELD

The embodiments of the invention relate to context based data analytics.

BACKGROUND

Computer-based information systems are utilized to process data for analysis. The systems existing for this purpose may provide mechanisms to collect, organize, and allocate data for use in analysis or serve only as data reporting or calculation tools. Research, analysis, and decision-making on a data-based approach is a time- and resource-intensive process requiring experience with the data and a formulation on how to utilize the data as information.

SUMMARY

It would be helpful to have an information context-based approach to data analytics based on visual intuition, or information visualization, leading to faster, more productive information contexts for conducting research, analysis, and or making decisions and building understanding and intuition.

A method and apparatus capable of supporting information context-based data analytics based on visual intuition, and generation of information contexts for conducting research, analysis, and/or decision making. An aspect of an embodiment relates to visual understanding and intuition systems.

Provide a tool that enables the automation of visual insights based on understanding, knowledge, and intuition gained through experience as a user of the information in context. An example benefit is to overcome the limitations of related technologies such as spreadsheets (difficult to gather insight and form a thesis from information based solely on data points in a sea of other data points), Commercial Off-The-Shelf (COTS) software (too generic to be of particular value for most effective analysis as each user brings a different perspective to the analysis of information in context).

Provide an efficient mechanism for storing, recalling, and understanding information intuitively by using relative values versus absolute values when possible, to capture the essence of the nature of relationships, changes, and absolute states over one or more sets of data, information, and time to generate a contextual understanding in a manner that a user with experience and expertise with the subject manner could find more appealing and intuitive for the purpose of using relative information, which is to create the opportunity for visually intuitive information without the need for endless data points with the idea of capturing the main thoughts about the nature of the relationship between/among information by visual Experiences of the information in relevant contexts.

Provide an effective mechanism for determining the value of data and information as it relates to the objective in an analysis, specifically aligned with the user's perspective and preferred methods of building and understanding information to determine courses of action, and to integrate through a user-driven, conceptual framework data to be used in a comparison or analysis with other data

BRIEF DESCRIPTION OF DRAWINGS

FIG. 4 represents a data table used to create Information Component Objects and Information Asset Objects, and Information Experiences and representative characteristics as components in the process of evaluating three job offers according to an embodiment of the invention.

DETAILED DESCRIPTION OF EMBODIMENT(S)

Embodiments of the invention facilitate the acquisition of knowledge and understanding intuitively.

Architecture Overview

Data represented within an Experience may originate from one or more of the following data sources: server device; client device, System-derived or System-generated, metadata, and other internal or external data sources. This data is processed centrally to gather context and to enable patterns with Information Experiences largely generated locally on a client device. Additionally, software-as-a-service users may have their Information Experiences generated centrally with the processing and visual rendering handled by a central system capable of providing a dynamic and robust user experience that could also benefit from some visual processing done by a locally-processed machine in a hybrid configuration.

Due to the process-intensive nature of the graphics rendering, the preference is for calculations, patterns, processing, storage, and other components of Information Experience "blueprints" to be separated from the visual processing if at all possible. However, there can be any number of configuration combinations involving locally-, server-, centrally-, and/or mobile-driven devices enacted to provide the processing and rendering in the most effective and efficient manner possible to ensure a robust, high-quality user experience.

Generating an Experience.

Figure 1:
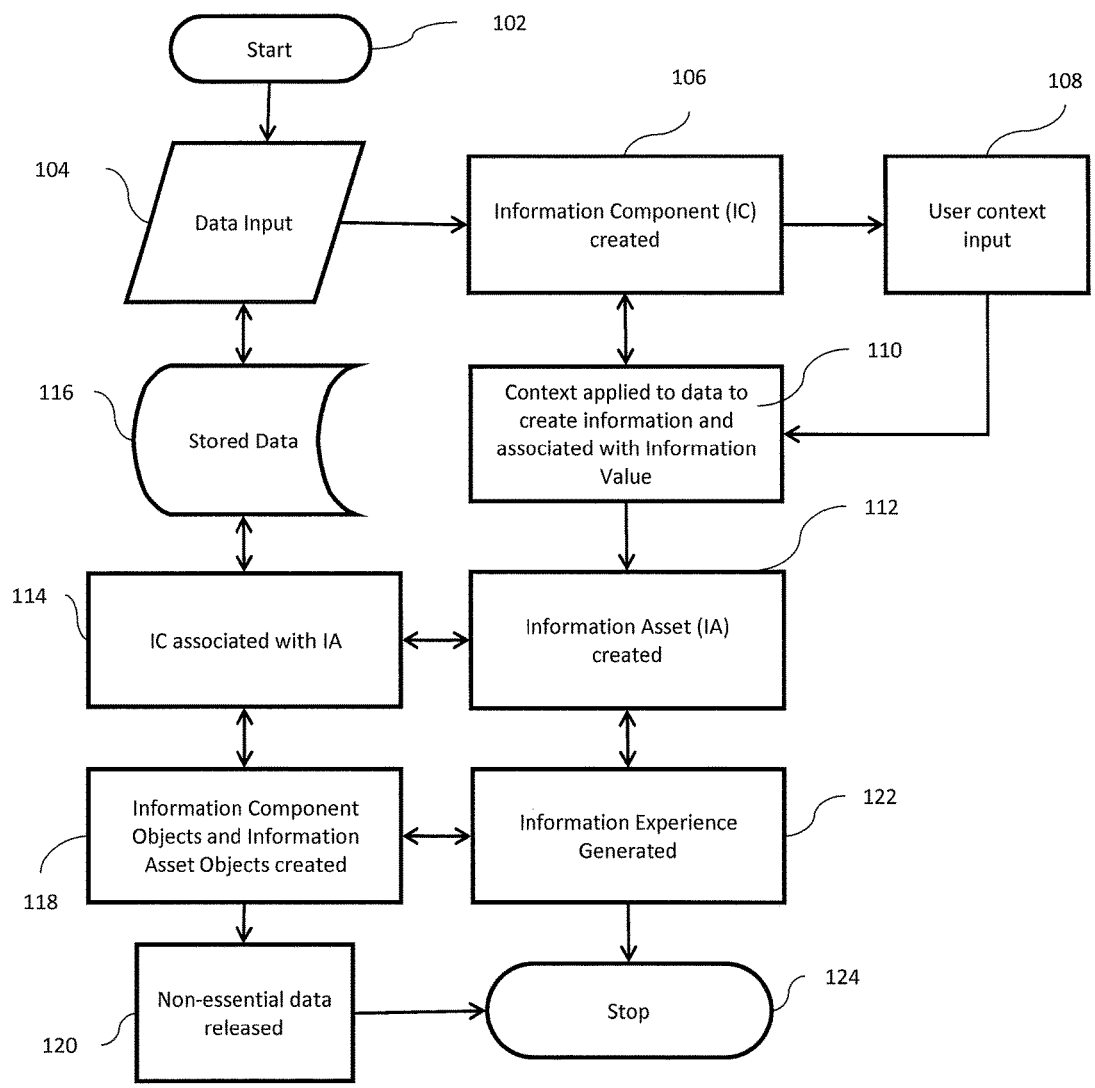
FIG. 1 is a flow chart representing the general flow of the program, according to an embodiment of the invention.

FIG. 1 is a flow chart representing the general flow of a program in a computer system for implementation of embodiments of the invention. In FIG. 1, a computer system can be a computer or any machine capable of processing information with data, information, and context pulled together to refine information.

102 Start of overall program flow.

104 Data source(s) such as database, flat files, manual entry by user, and web-originated context.

106 represents the creation of an Information Component, which represents a is one or more components of data.

108 User adds context such as opinions, values, estimates, and environment variables to the data, which is used to create specific reference 110 Context is applied to data to create information, and Information Value is determined for the information based on user-driven contexts and associated with Information Value 112 An Information Asset is created, which represents a set of data components, or Information Components used to provide understanding of the information 114 Information Component is associated with the Information Asset 116 Information about the Information Component and the Information Asset is stored 118 Objects are created to represent Information Components and Information Assets as an embodiment of the invention 120 Information is maintained as sets of relative references and non-essential data is released 122 Information Experience is generated and the process of visualizing the information as assets occurs, at 124 the process can be stopped. More particularly, the embodiments include providing a defined way to calculate the value of target information as pertinent (contextual) to a user, the ability to take in qualitative input and use it with quantitative input provided with Information Value and a basis in reason by using context maps carrying meaning, weight, and Information Value as the user perceives the target information, a way of storing and accessing data maintained as relative values, and an approach that enables approximations when appropriate and deemed relevant by the user versus a dependency on absolute values, the application of many physical sciences concepts including gravity, gravitational force, density, volumes, and mass, among others to represent the characteristics of information and decoupling the interest in data, to information by treating the information as if it possessed physical traits, creating objects that convey information without having to contain data by capturing the information garnered from data in the user's context as characteristics, or attributes, of the objects themselves, thereby, removing any need for the maintenance of a vast array of data, and creating visualizations of information that are specific to a user's perceptions and a way of understanding in a very flexible manner. For example, the embodiments relate to the technical field of data analysis.

User context pulled from storage (existing or new context added to storage) includes the efficient storage and retrieval of information in context versus just data.

Information in Context represents a mechanism to provide for the use of information in associated context to determine Information Value, which is derived from user-driven opinions, thoughts, and other assessments of data and information with the user's specific state of information understanding and intuition represented as Information in context Data is one or more components of information that have relevance for one or more sets of information, and exists in an electronic form that can be processed within a computer.

Standardized data refers to any data that can be recognized in the invention as an input value and can be used for the purposes of determining Information Value Non-standardized data refers to any data that is not recognized as an input value without explicit direction by the user for the purposes of determining Information Value The term metrics refers to the data classification, category, title, or other descriptive used to identify an attribute of an Information Asset as could be stored within a set of data such as would exist in a column of similar data relevance and relationships within a database.

The term Information Component (IC) represents one or more components of data used to build information.

Figure 2:
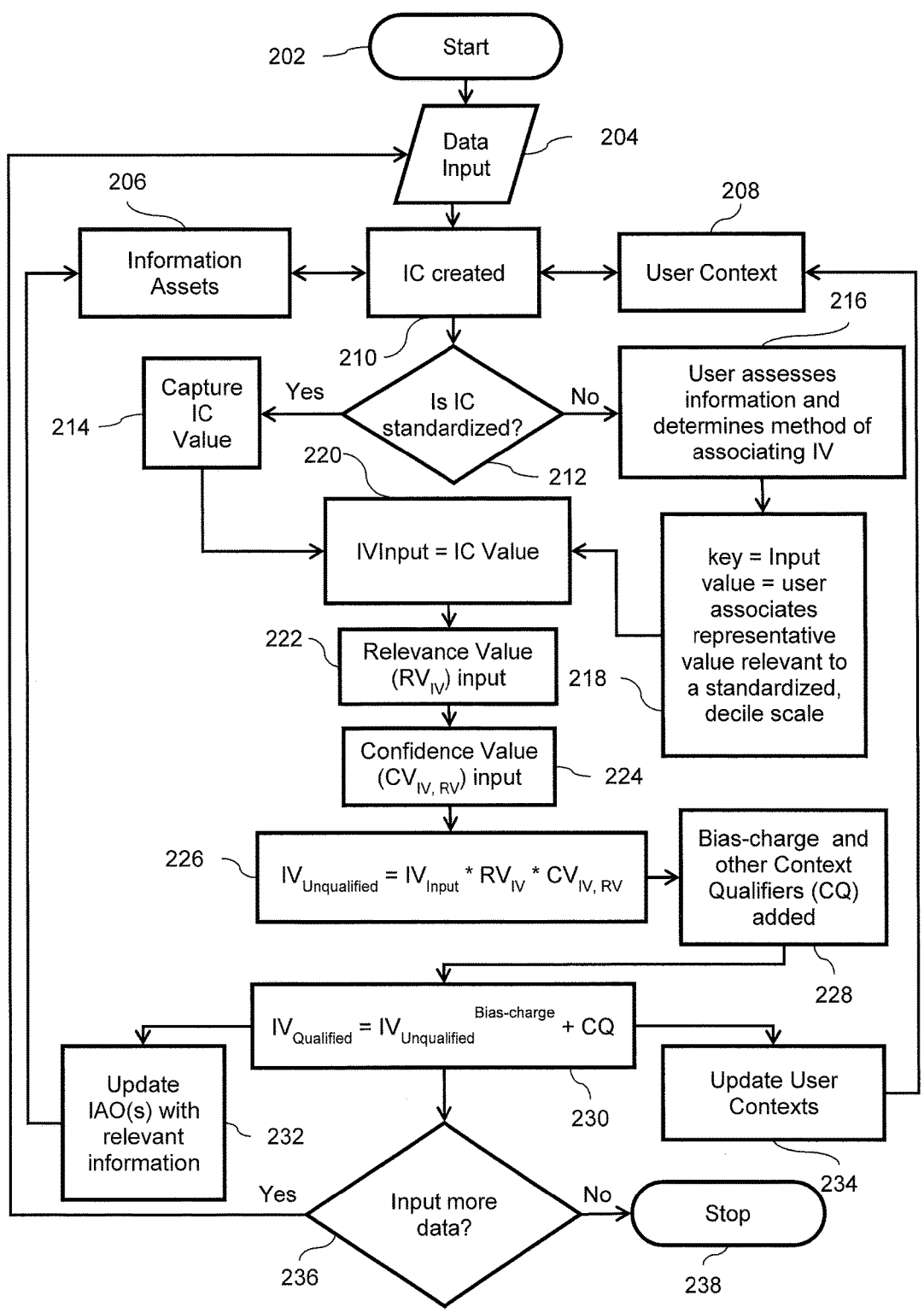
FIG. 2 is a flow chart or processing of the association of data, information, and information context with Information Value, according to an embodiment of the present invention.

FIG. 2 represents a flow chart of the calculation of Information Value as an embodiment of the invention. FIG. 2 is a flow chart or processing of the association of data, information, and information context with Information Value, a mechanism to provide for the use of information in context, which is Information Value (IV) derived from user-specific opinions, thoughts, and other subjective assessments of data and information at a specific reference point in time and the user's specific state of information understanding and intuition represented as Information in Context; Context is achieved through the input, capture, and processing of user-defined perspectives and applied to the data in a manner that aids in understanding, according to an embodiment of the invention.

202 represents the start the process of Information Valuation 204 represents the initial data input into the process of calculating IV 206 represents the identification and inclusion of IAOs relevant to the data and are input or called from storage 208 represents the identification and inclusion of information context relevant to the data input are input or called from storage 210 represents the creation of an IC as data and context as information and associated with a relevant IAO as an attribute or IC of the IAO and with a context update to the user's context, the IAO's context, or both that reflects the use of the IAO, input of the data that created the IAO, and references to context identified and associated with the data in one or more IAO, user, and system Context Profiles that defines the information enabled from the data input is the result of the input and context from the user, the data source, and any relevant environment variables such as time, date, and other metadata 212 represents the determination of IC as a standardized component of data, and if so, the value is captured and if not, the value is standardized 214 represents a standardized value being captured as a raw value and ready for processing as IVInput 216 represents non-standardized value being assessed by the user to determine the method by which it can and will be processed into standardized value to be used as a raw value ready for processing as IVInput 218 represents the association of the non-standardized data to a standardized value using a key-value system to create temporary or permanent associations for the user 220 represents the standardized value as the IVInput value representing the first component necessary to calculate IV 222 represents the user's assessed value for the relevance of the IVInput value as it relates to the IVInput's level of importance to the formation of information as a component of an IAO relative to the levels of relevance for other ICs combined such that the sum of RVIV for all ICs in the IAO equals 1 and generally expressed as a percentage and with a default value of 1

224 represents the user's assessed value as a perceived level of confidence in the user's assessments of IVInput value and RVIV as each relates to strength of confidence and accuracy, expressed as a percentage and with a default value of 1

226 represents the calculation of IVUnqualified, which represents the IV after accounting for relevance of the IVInput and confidence in the IVInput and RVIV values assessed but before the adjustments for bias or any Context Qualifiers 228 represents the application of Bias-charge, which represents the inclusion of a qualification for the orientation of Information Value with changes or differences in the underlying data and as represented generally by a value of −1 or 1, but can be represented as any value between −1 and 1, and Context Qualifiers, which represents a general form of a mechanism employed to account for components of information that are perceived, estimated, or hypothesized to be impactful, but not captured as a component of the data value and requires an adjustment representing a 10% increase or decrease of the IVUnqualified and can be used to account for general environmental factors as one value and generally represented with a value in a range of −1 to 1

Figure 3A:
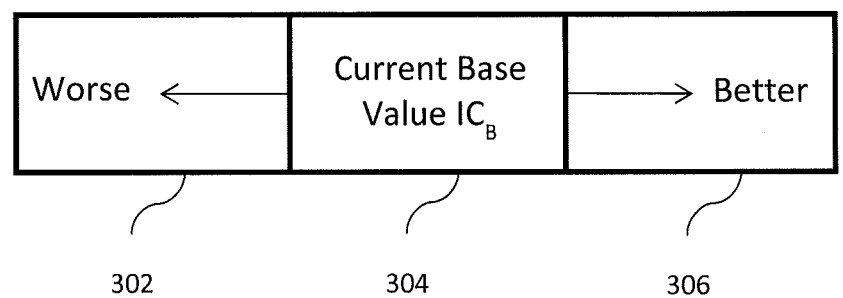
FIGS. 3A-B represent a set of graphics depicting the process of determining Information Value based on relative references, specifically, 3A depicts a visual tool used to enable the relative value of an Information Asset Object by its placement to the left or right of the base Information Asset Object, and 3B is a flow chart of the process of determining Information Value by associating an Information Component (IC) with a value based on the user's perception of its value relative to the value of another Information Component, according to an embodiment of the invention.
Figure 3B:
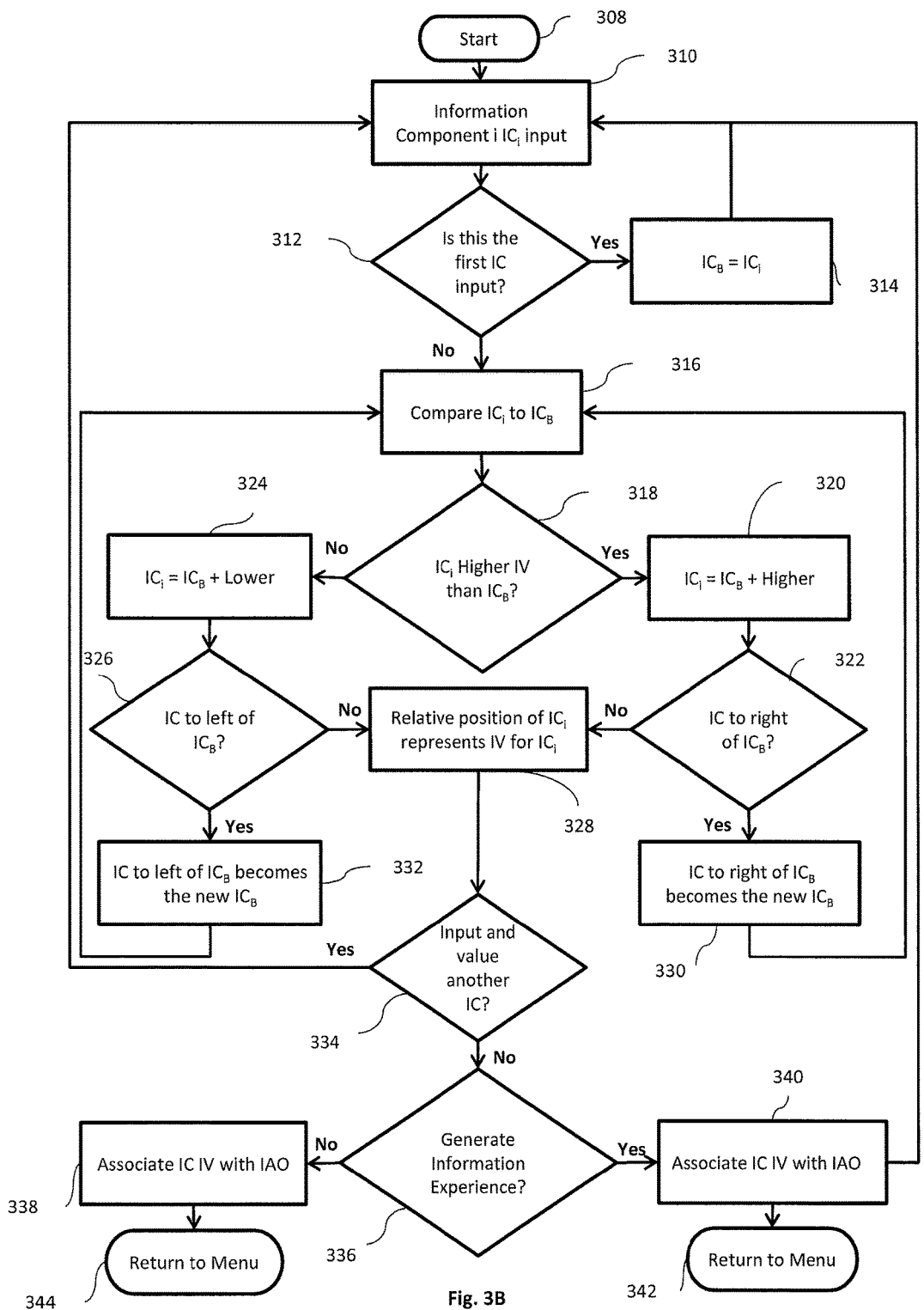
Figure 10:
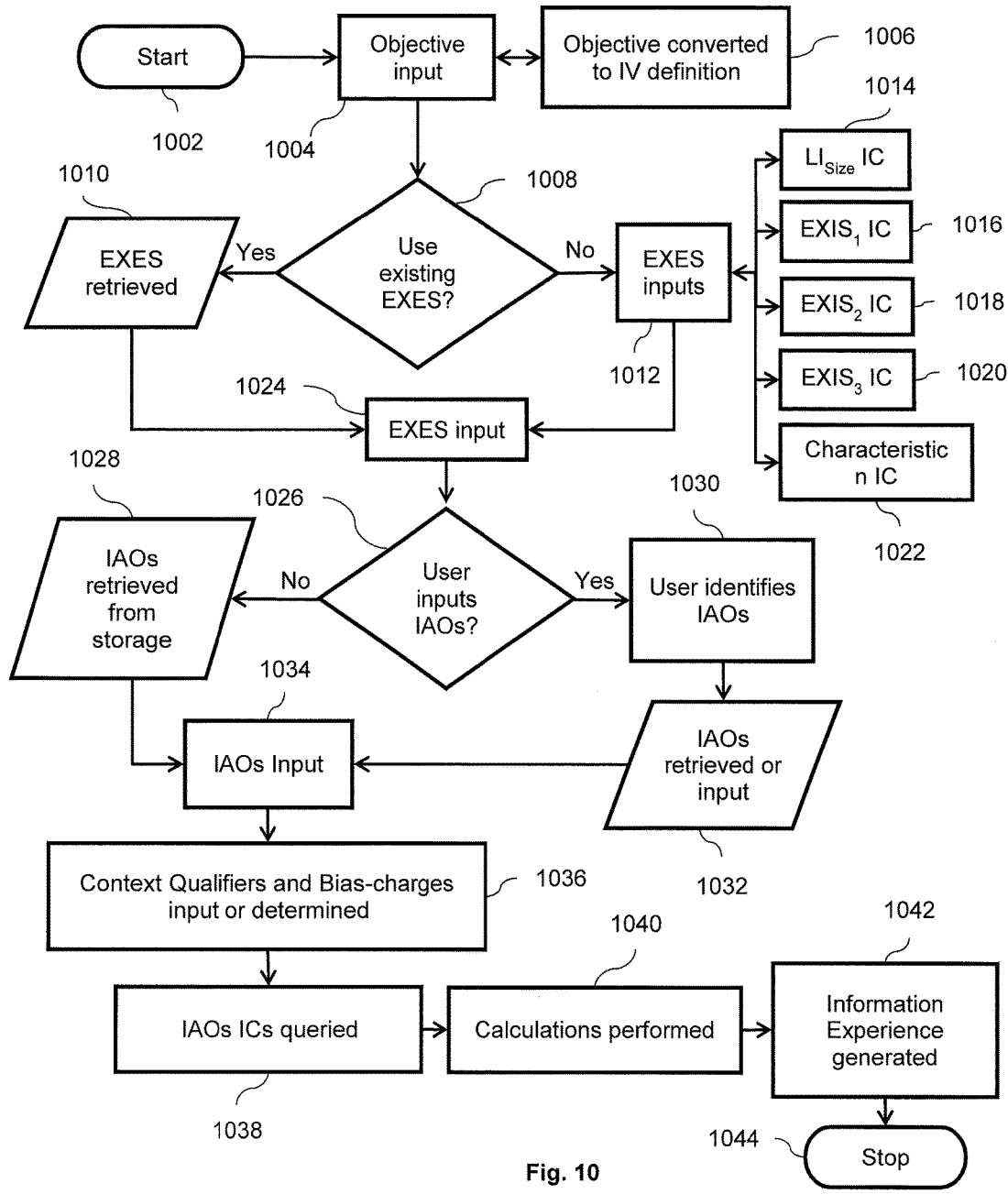
FIG. 10 represents a flow chart for creating a basic Information Experience, according to an embodiment of the invention.

230 represents the calculation of IVQualified, which represents the IV after accounting for relevance of the IVInput and confidence in the IVInput and RVIV values assessed and after applying the Bias-charge and any adjustments for any Context Qualifiers 232 represents the process of updating any IAOs impacted by the Information Value and the IC, which are added to a relevant IAO 234 represents the process of updating any user contexts that are impacted by the addition of the IC to an IAO and any user-specific contexts applied in the calculation of IV 236 represents the user's decision to continue the process of inputting data to calculate IV and if yes, then the user returns to data input, or no the processing of IV stops 238 represents a stop in the IV calculation process FIG. 3A depicts a relative valuation tool, a mechanism used to enable a user to associate Information Value with an Information Component based on its perceived worth to the user as a direct comparison with another Information Component as an alternate method of 216 and 218 in 302 the center box represents the positional reference position for a base value Information Component ICB used as a comparison Information Component in 304 the box to the left represents the potential assessment Information Value for a decision of relatively lower Information Value than is perceived by the user to represents the positional reference position for a base value Information Component ICB used as a comparison Information Component in 306 the box to the right represents the potential assessment Information Value for a decision of relatively higher Information Value than is perceived by the user to represents the positional reference position for a base value Information Component ICB used as a comparison Information Component 308 Start the process of Information Valuation 310 Data input created as Information Component ICi where I represents the current Information Component being valued 312 represents the question of whether ICi is the first data input in the comparison represented by the variable ICB, which is the base value Information Component used for comparison, has a blank value signifying that ICi is the first IC input and used as the ICB value 314 ICi becomes ICB, the base value 316 Compare ICi to ICB 318 User assesses the value of ICi relative to ICB; the value of Ici does not have to be quantifiable as a user with experience with the information can have an ability to render judgment of the relative values regardless of form 320 ICi is assessed a relatively higher IV than ICB and can be conceptualized as ICB+"higher", where higher does not have to be quantifiable, but rather can be allocated a relative value 322 represents the question of whether there is an IC in the position to the right of the base value ICB, and if so then Ici is compared to that value in a continual process until there are no more Ics to the right of the ICB or until the user assesses ICi a relatively lower IV than another IC and the ICi takes the IV allocated to that position 324 ICi is assessed a relatively higher IV than ICB and can be conceptualized as ICB+"higher", where higher does not have to be quantifiable, but rather can be allocated a relative value 326 represents the question of whether there is an IC in the position to the left of the base value ICB, and if so then ICi is compared to that value in a continual process until there are no more Ics to the left of the ICB or until the user assesses ICi a relatively higher IV than another IC and the ICi takes the IV allocated to that position 328 the position of ICi is established and an IV is associated as position 330 the IC in the position to the right of the base value ICB becomes the new base value ICB and ICi is evaluated against the new base value ICB 332 the IC in the position to the left of the base value ICB becomes the new base value ICB and ICi is evaluated against the new base value ICB 334 user decides whether to input another IC to continue the relative valuation and if the user chooses to input another value the process continues with comparison against the current base value ICB 336 user can choose to visualize the relative Information Value in an Information Experience in FIG. 10 or can end the process 338 Associate the IV as a context component by referencing a pre-defined scale, as a calculation based on the number of ICs in the Comparative Set and position of ICi relative to other ICs in the Comparative Set, or other method as determined relevant to the user's understanding and store the IV as a value based on the position relative to other ICs in the Comparative Set 340 After the Information Experience, IV is associated as a context component by referencing a pre-defined scale, as a calculation based on the number of ICs in the Comparative Set and position of ICi relative to other ICs in the Comparative Set, or other method as determined relevant to the user's understanding and store the IV as a value based on the position relative to other ICs in the Comparative Set 342 Return to the menu 344 Return to the menu FIG. 4 is a data table consisting of example data that represents components of a decision with regard to a user's evaluation of 3 separate job offers represented as Information Asset Objects, and based on the Information Valuation of four Information Components, three Information Assets, a Comparative Set, and a job offer Decision Set 402 represents a column of data specifying the input order of the base Information Components 404 represents a column of data specifying the base Information Component metric representing job components data 406 represents a column of data specifying the $IV_{Input}$ value representing the value to be used as a basis for comparison for IAO ICs 408 represents a column of data specifying $RV_{IV}$, the level of importance, or relevance, of the $IC_B$ $IV_{Input}$ relative to other IC $IV_{Input}$ values within the base value IAO that is applied like a weight and when summed with the other three ICs within the IAO, equals 1, generally expressed as a percent and with a default value of 100%, or 1

410 represents a column of data specifying $CV_{IV, RV}$, the confidence level placed on the assessments of $IV_{Input}$ and $RV_{IV}$ as strength of Conviction for the $IC_B$ value, generally expressed as a percent and with a default value of 100%, or 1

412 represents a column of data specifying IV, which represents the Information Value in the base value IC $IC_B$ and calculated as $IV_{Input}*RV_{IV}*CV_{IV, RV}^{Bias-charge}$ 414 represents a column of data specifying the bias in the Information Value as either positive, which reflects a positive relationship between the $IV_{Input}$ and Information Value, or negative, which reflects a negative relationship between the $IV_{Input}$ and Information Value.

416 represents a column of data specifying the bias in the Information Value relative to an increase in the data value and generally represents a value of 1, which is positive and conveys the Information Value increases with increases in the underlying data value in $IV_{Input}$, or −1, which is negative and represents a decrease in Information Value with an increase in the underlying data value.

418 represents a column of data representing the input value or $IV_{Input}$ for non-base value ICs, which is the primary input value leading to the creation of an Information Component and represents raw value or initial input as an associated IV.

420 represents the level of relevance or importance assessed for the IVInput relative to all other $IV_{Input}$ values within a set of data leading to information, or as an IAO as instantiated, and generally expressed as a percentage.

422 represents t the level of confidence in with values expressed as a percentage, and calculated as the $\Sigma(CV_{IV}*w(CV_{IV})+CV_{RV}*w(CV_{RV}))$, where $CV_{IV}$ is the confidence assessed for the $IV_{Input}$ value, $w(CV_{IV})$ refers to the relative weighting of $CV_{RV}$ relative to the weighting of $CV_{IV}$, $CV_{RV}$ represents the confidence level in the assessment of the IC's relative level of importance, and $w(CV_{RV})$ represents the relative weighting of $CV_{RV}$ to the weighting of $CV_{IV}$ where $CV_{IV}+CV_{RV}=100\%$, or 1.

in 424, $IV_{scaled}$ represents a column of data specifying the Information Value as the user-driven, quantified approximation value determined by the user to represent the value of the non-standardized or qualitative $IV_{Input}$ value, as obtained from a Context Map as an embodiment of the invention.

In 426, IV represents a column of data specifying the Information Value as calculated as $IV=(IV_{Input}*RV_{IV}*CV_{IV, RV})^{Bias-charge}$ for standardized data values, and as $IV=(IV_{Scaled}*RV_{IV}*CV_{IV, RV})^{Bias-charge}$ for non-standardized values, where $IV_{scaled}$ represents the user-driven, quantified approximation value determined by the user to represent the value of the non-standardized or qualitative $IV_{Input}$ value, as obtained from a Context Map, and Bias-charge represents the user bias reflected in the information context and represents the relationship between the changes in $IV_{Input}$ and the perceived impact to Information Value in the form of a positive or negative relationship.

In 428, $LI_{Mass}$ represents a column of data specifying the Information Value in IC, relative to the base Information Value $IC_B$ and calculated as $(ICIV_i/ICIV_B)^{Bias-charge}$, where $ICIV_i$=the IV in $IC_i$ in, $ICIV_B$=IV in $IC_B$, and Bias-charge is a value of 1 or −1 which conveys the Information Value as it relates to increases in the underlying value.

in 430, $LI_{Volume}$ represents a column of data specifying the spatial volume occupied by $ICO_i$, where $ICO_i$=the object representing $IC_i$, and calculated as $(4/3)*pi (\pi)*ICLI_{Size}^3$ where $ICLI_{Size}$=the $LI_{Size}$ of ICi, or radius=1.

In 432, $LI_{Density}$ represents a column of data specifying the units of IV per Unit of $LI_{Volume}$ and used to determine the Logical Information Layer within the IAO that the IC will occupy based on comparison with the $LI_{Density}$ of other ICs within the IAO, and in essence places the more valuable information closer to the object's center.

Figure 5A:
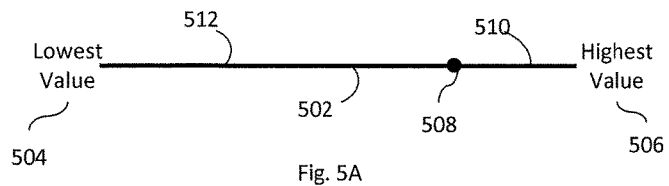
FIG. 5A is a line representing a sliding scale representing the Relative Option form of the Information Decision Scale, according to an embodiment of the present invention.
Figure 5B:
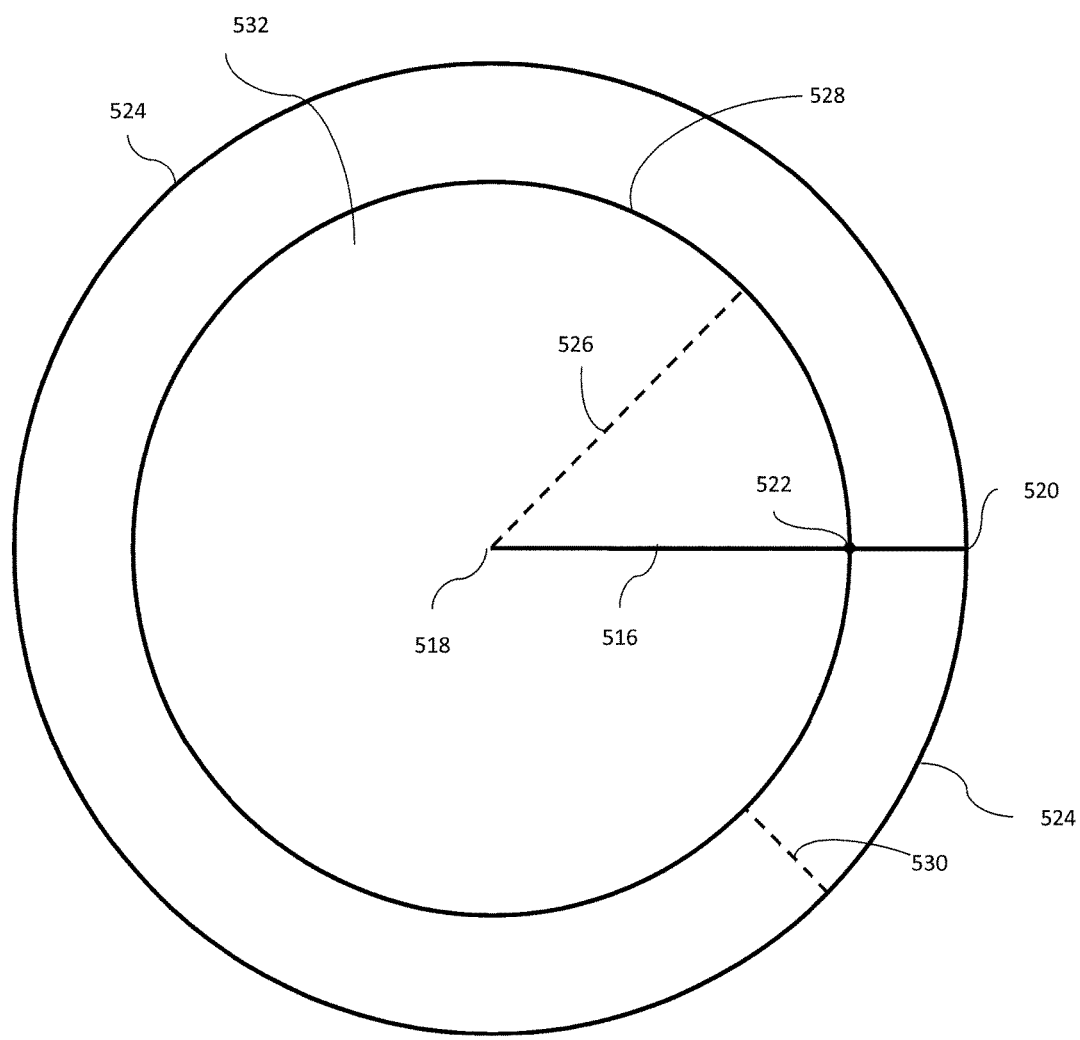
FIG. 5B depicts the cross-section of 2 concentric spheres representing the user's probability assessments for positive and negative outcomes, namely a depiction of the process of determining Information Value by associating an Information Component with an outcome on an Information Decision Scale, according to an embodiment of the invention.

FIG. 5A is a line representing a sliding scale representing the Relative Option form of the Information Decision Scale, which enables the user to determine the perceived value of data visually as a location along a horizontal line representing two or more outcomes by referencing or selecting a point position and serves as the split between lower Information Values to the left and higher Information Values to the right of the selected position used to allocate decisions based on proximity, which is then scaled and used to create the relative Information Value for an Information Component in FIG. 5B, depicted with the lowest value representing the lowest Information Value at the left end of the line, the highest value representing the highest Information Value at the right end of the line, and the total line length representing 100% of the available Information Value in the Information Decision and represents another possible means of inputting IV in 108, 110, 216 and 218.

502 represents the line from Lowest to Highest Value represents the Information Decision Line, which represents 100% of the Information Value possible in the Information Decision

504 Represents the Lowest positive Information Value available in the Information Decision, or 0%

506 Represents the highest positive Information Value available in the Information Decision, or 100%

508 Represents the user's assessed value as a relative distance from the two extreme values at either and of the Information Decision Line representing 100% of the total Decision Value with the assessed value representing a percentage value when considered from the Lowest Value position on the Information Decision Line represents the distance from the origin to the assessed value=(Assessed Value−Lowest Value)/Total Decision Information Value

510 The segment of the line from the user's assessed value to the highest Information Value to the right, which is the component of the Information Decision Line representing relatively higher Information Value not selected by the user, or"Miss" based on user's assessed value, calculated as 1−((Assessed Value−Lowest Value)/Total Value), where total Information Decision Value is represented as the length of the line from Lowest to Highest Value

512 The segment of the line from the user's assessed value to the lowest Information Value to the left, which is the component of the Information Decision Line representing relatively lower Information Value, or"Beat" based on user's assessed value, calculated as (Assessed Value−Lowest Value)/Total Value, where total Information Decision Value is represented as the length of the line from Lowest to Highest Value.

FIG. 5B depicts the cross-section of 2 concentric spheres representing the user's probability assessments for positive and negative outcomes, a line representing the Information Decision Scale in 508 depicted as the radius of the larger sphere, and a point representing the user's Information Decision in 506 plotted as a point along the Information Decision Line.

in 516 the line depicts the Information Decision Line in FIG. A 502 (Line) as a radius of the larger sphere 524, which represents the total Information Value (100%) in the Information Decision and is used to determine the size of the larger sphere, which represents the Information Decision Information Asset Object based on a radius=1 Logical Information Unit.

in 518 represents the highest Information Value on the Information Decision Line in FIG. 5A 504, which represents the lowest Information Value possible in the Information Decision, or 0% positive IV.

in 520 represents the highest Information Value on the Information Decision Line in FIG. 5A 506, which represents the total positive Information Value in the Information Decision, or 100% positive IV.

in 522 the point represents the user's assessed value along the Information Decision Line as depicted in FIG. 5A 508.

Figure 6:
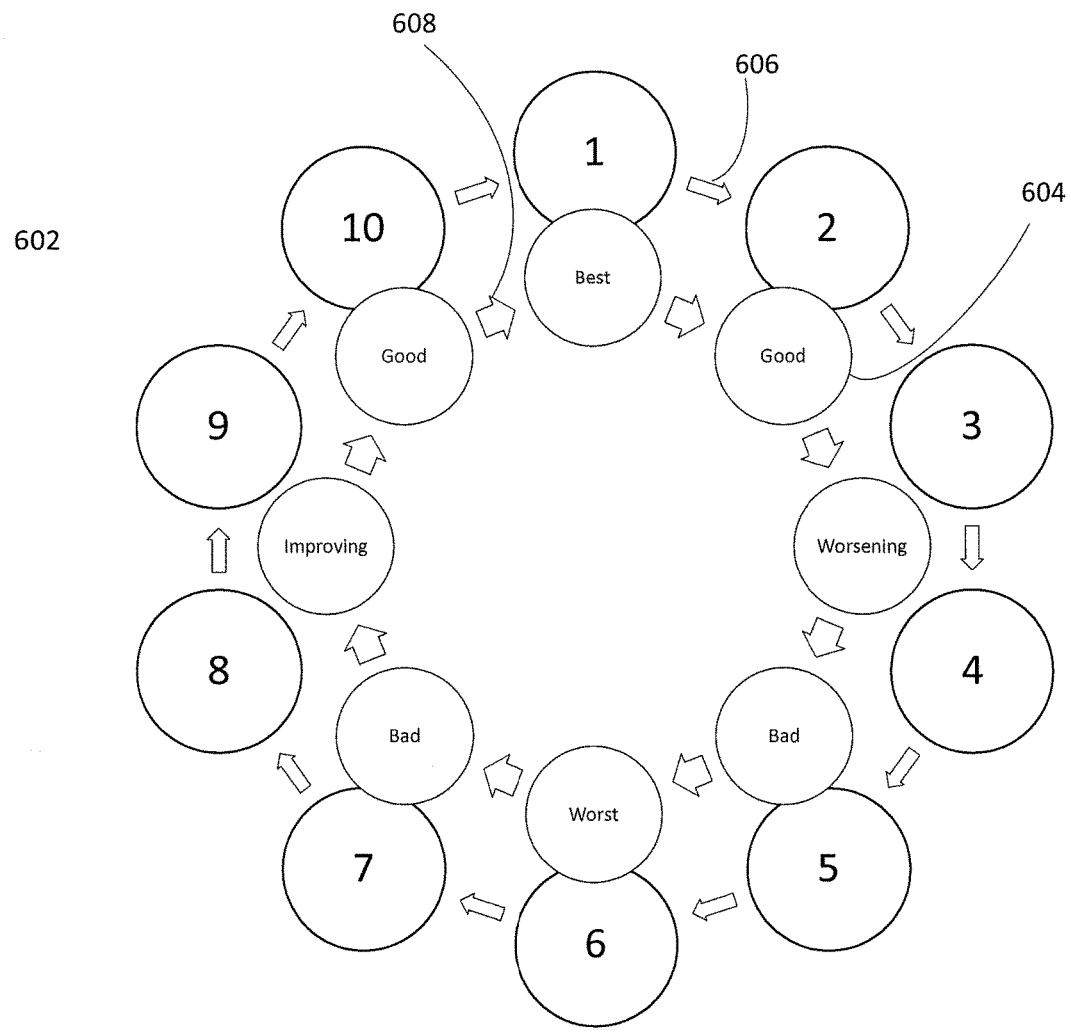
FIG. 6 is a cyclical flow chart of the process of determining Information Value by associating an Information Component with an Opportunity Scale, according to an embodiment of the invention.

524 represents the larger of two spheres as derived from 100% of the Information Decision Line in FIG. A 502 and calculated as $(4/3)*pi*LISize3$, where LISize=the length of the Information Decision Line.

in 526 the line represents 510 the portion of the Information Decision Line not included in (to the right of) the user's assessment, which represents the user's assessed value for a negative outcome and lower Information Value and calculated as Larger sphere LISize−Smaller sphere LISize in 528 the dashed line represents a line length equal to the portion of the Information Decision Line included in (to the left of) the user's assessment, which represents the user's assessed value for positive outcome and higher Information Value and calculated as Assessed IV/Total IV in the Information Decision Line in 530 represents the radius of the smaller sphere, which represents the distance from the lowest Information Value on the Line to a point on the Line representing the user's assessed value (to the left of the user's assessment) in the Decision, or the line representing the user's 75% probability assessed for a positive outcome−the lowest Information Value on the Line in FIG. 5A at 512, and used to determine the size of the Higher Information Value Information Component Object and calculated as $(4/3)*pi*LISize3$, where LISize=the user's assessed probability for a positive outcome of 75%/total probability of 100%*Logical Information Unit in 532 Sphere represents the user's assessment for a 75% probability of a positive, or higher Information Value, outcome FIG. 6 depicts an Opportunity Cycle, which enables users to plot values for a user-driven decision where the user prefers not to or cannot determine an absolute value to attach to an Information Component, with the innermost set of spheres the keywords, phrases, or any user-driven determination of a representative set of keys which when visually referenced shows an order that makes sense to the user in a relative manner enabling the user to associate relative states such as "best", "better", "above" that provide clear evidence of the users opinion being expressed as value, and the outermost set of spheres represents a default cycle of 10, evenly-incremented values, which when plotted against the keywords can be used to calculate an approximate representation of value association, which the user can then input as such by selection or other input device, or can have the keys and associated values added as a component of the user's context for use in similar situations requiring the user's basis in reason enabling the use of the opportunity scale and once established, the user no longer needs to see the outermost cycle of spheres as the keywords are already plotted to their associated values and thus a keyword that has the highest value to the user will always enable the user to assess information with only the keywords, and the Opportunity Cycle does not have to appear with a set of terms if the user prefers to plot the value by visual reference without creating an entry in the user's context profile and is another example of inputting context and deriving IV as in 216, 218, 220, 222, 224, 226, 228, 230 as an embodiment of the invention In 602, the 10 spheres in the outermost ring in the graphic depict a 10-digit ranking system of 1-10 in order from highest rank=1 and lowest rank=10, which provide relative reference points for the user's determination of value In 604, the innermost cycle of sphere represents the keyword system implemented or understood by the user

606 represents the general flow of the Information Value in each term with user-driven reasoning as the key component in the set-up or use of the Opportunity Cycle

Figure 7:
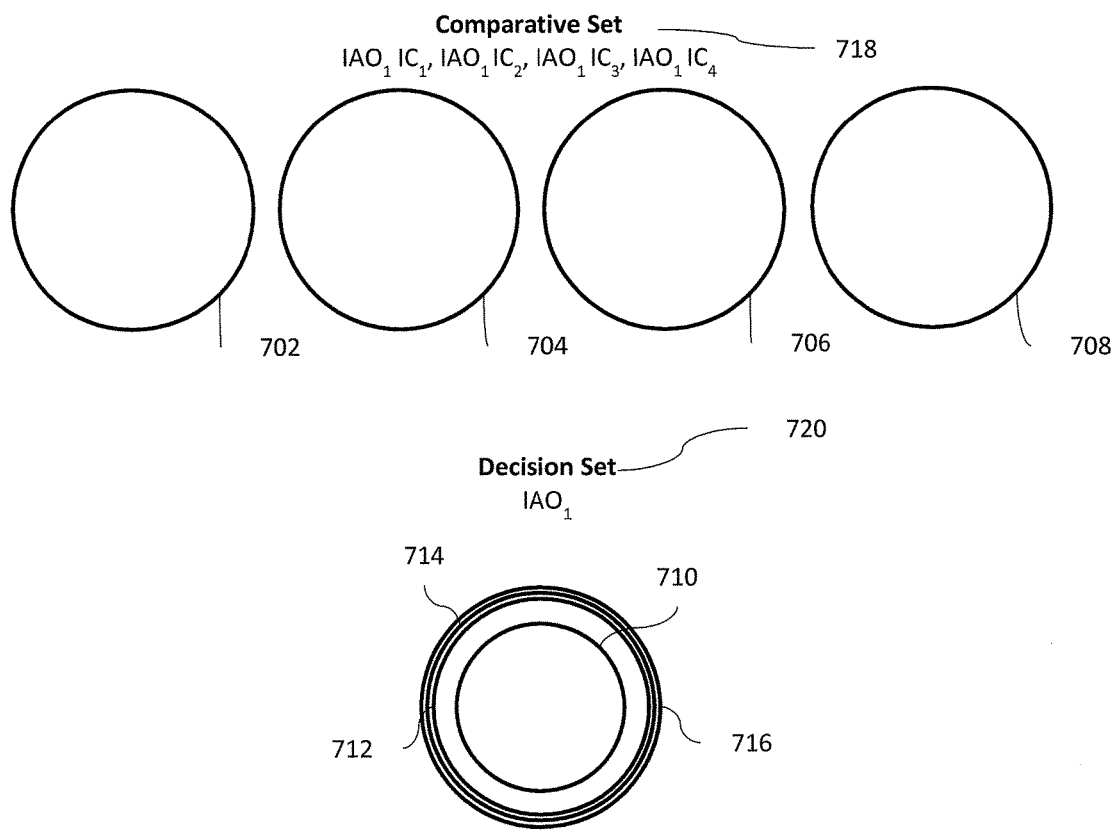
FIG. 7 is a depiction of creating Information Asset Objects comprised of Information Component Objects, an Information Asset Object comprised of 4 Information Components, a Comparative Set, and a Decision Set using the flow chart in FIG. 3B and data in FIG. 4, and includes the use of logical information mechanisms such as LISize, LIVolume, LIMass, LIDensity to achieve the impact of these components of an IAO, according to an embodiment of the invention.

608 represents the arrows which show information used in this scale change values in relatively constant order, for example, in going from "Best" to "Worst" the cycle assumes information moves in cyclical patterns of highs and lows, which can be plotted on the cycle to derive Information Value FIG. 7 represents the formation of Information Components as would be visualized in an Information Experience, including Information Component Objects, Information Asset Objects, a Comparative Set, and a Decision Set using FIG. 4 as an example of a user's application of data to make an Information Decision with regard to the selection of one of three jobs based on the user's preferences and data input from the job offers, and represents 110, 112, 114, 118, 206, 210, 232, and represents the use of using relative values in visual form to associate information in the user's context calculated based on a user-driven discovery of IV, and serving as a relative storage model as an embodiment of the invention in 702, the sphere represents an Information Component Object representing the location in miles for a job offer as embodiment of the invention in 704, the sphere represents an Information Component Object representing the salary for a job offer as embodiment of the invention in 706, the sphere represents an Information Component Object representing the user's qualitative assessment of the benefits package for a job offer as embodiment of the invention in 708, the sphere represents an Information Component Object representing the hours per week the user expects to have to work if the job offer is accepted as embodiment of the invention

710 the Information Component Object among the four spheres representing the highest information Value

712 represents the Information Component Object among the four spheres representing the next highest information Value

713 represents the Information Component among the four spheres representing the third-highest information Value

716 represents the Information Component among the four spheres representing the lowest information Value

718 represents four Information Component Objects s as a peer set with equal sizes and volumes to be evaluated in a comparison based on a common base value and when taken together are termed a Comparative Set

Figure 8:
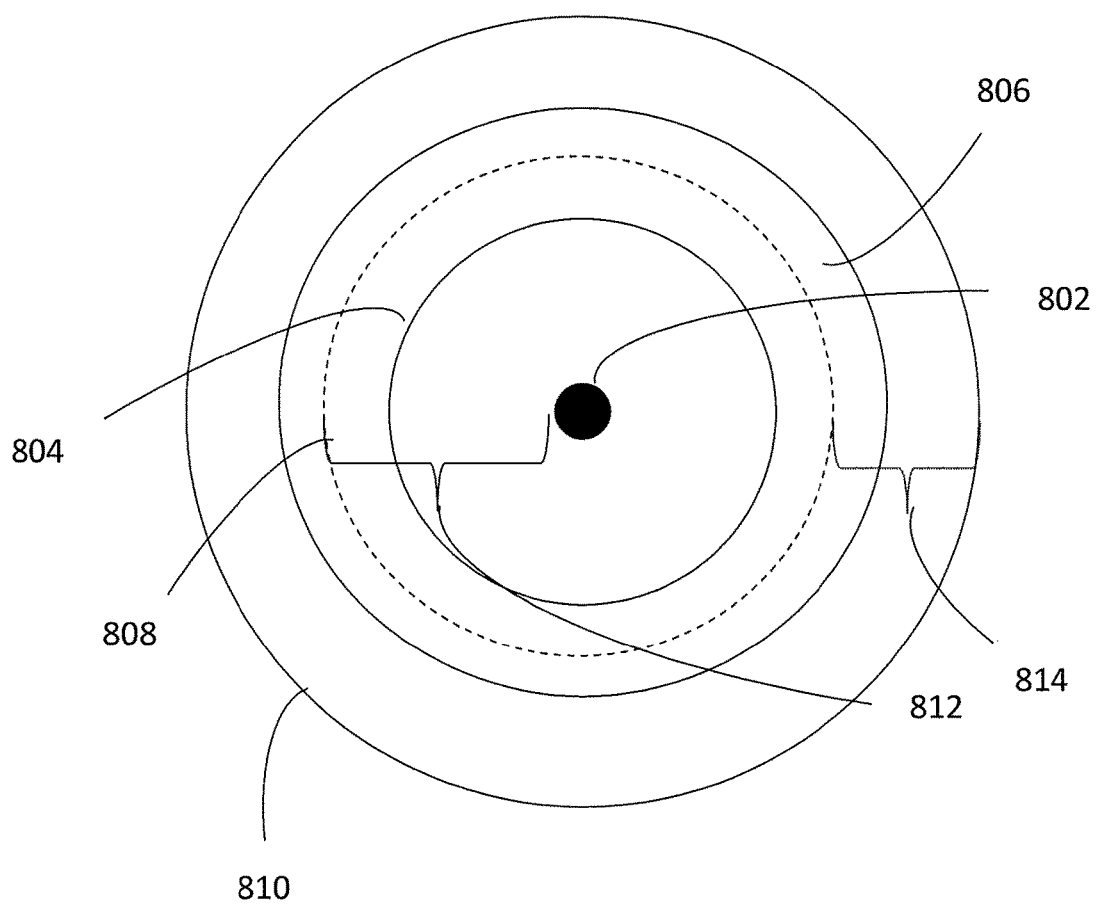
FIG. 8 represents the analysis of information as presented as an IAO, or Decision Set, according to an embodiment of the invention.

720 depicts a set of 4 concentric spheres, which represents a Decision Set with each sphere organized logically and visually based on their relative Information Value per unit of $LI_{Volume}$ and scaled as a percentage of the total cumulative Information Value of the four Information Component Objects FIG. 8 represents the analysis of information as presented as an IAO, or Decision Set as in 112, 114, 116, 936, in 802 sphere represents a core level of value, or can be used to represent the IV, or another metric visually in 804 represents the absolute low value over an observation range of time that is equal to a 5-year investment time horizon in 806 represents the current value as representing in the market or based on a user-driven method of determining or retrieving a value such as would occur for a fundamental investor during the application of price and company fundamentals data in combination to derive a fundamentals-based value the user believes adequately represents the current value based on the current market price in 808 represents the current value or price which in the example if $25 for Stock A in 810 sphere represents highest possible value and represents the target, projected, or historical high IV visually in 812 represents the downside risk assuming the core value assessed is accurate with a downside representing 72% and calculated as low value/current value−1 in 814 represents the upside opportunity, or the potential gain, in the value of the information, which in the example is 104% and calculated as high value/current value−1 in 814 represents the Valuation Opportunity, which determines the Information Value based on a potential for a gain in the Information Value and the potential loss in Information Value based on any combinations of data, user preferences, assessments, and any other derived values and calculated as abs((high target Information Value/current Information Value−1)/(low target Information Value/current Information Value−1)), where abs represents absolute value, high target Information Value is the value representing the highest Information Value expected for this IAO, low target Information Value is the value representing the lowest Information Value expected for this IAO, current information value represents the current Information Value and in the example represents 2.833

Figure 9:
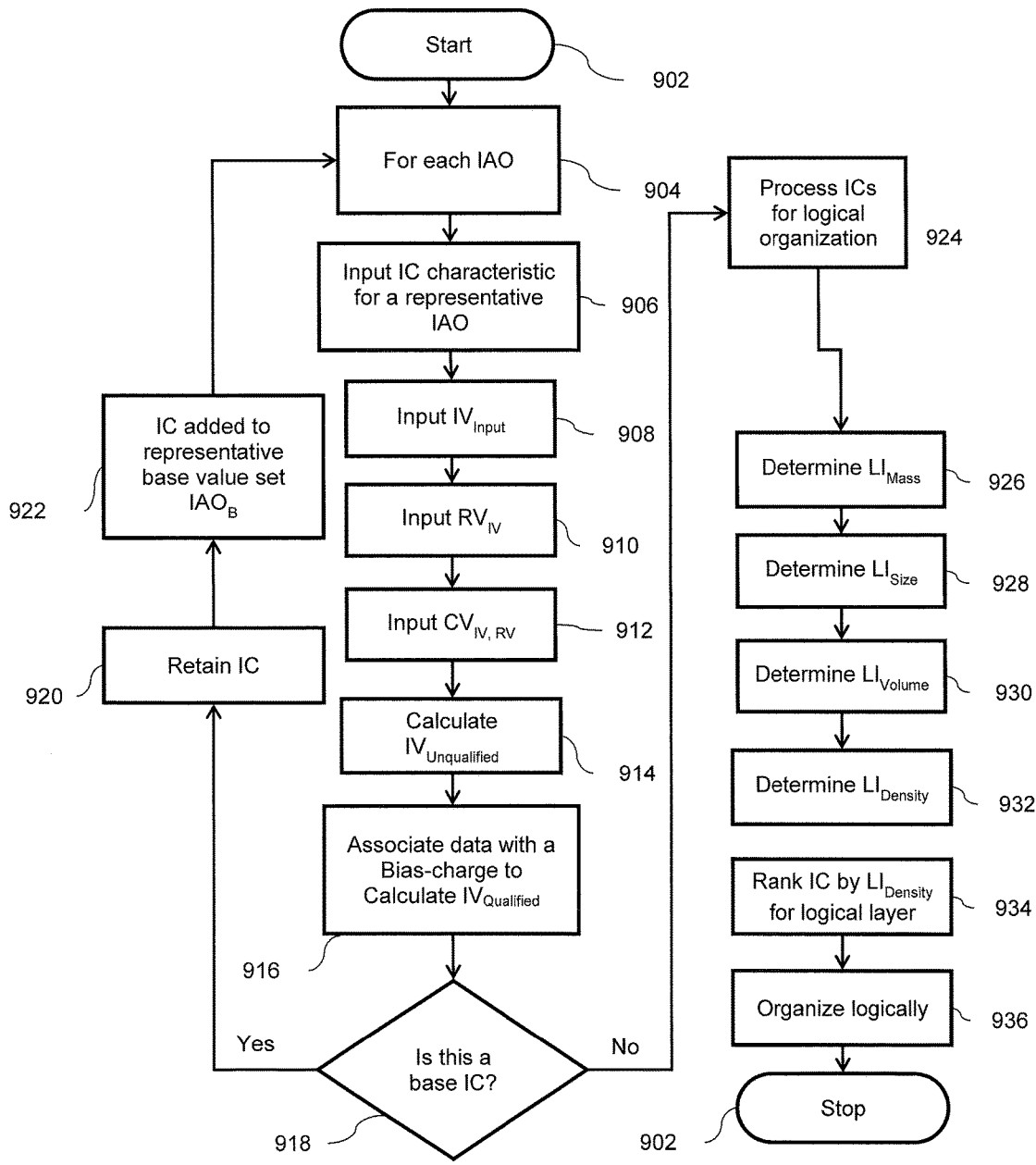
FIG. 9 represents a flow chart of the determination of IAO based on relative sizing instead of the system default method of common sizing, according to an embodiment of the invention

FIG. 9 represents a flow chart of the process of creating an IAO for visual understanding, which represents data with added context and an associated, user-driven IV to determine the characteristics of the IAO as a set of Information Components logically sized based on internal, relative reference within an IAO, and preparing the IAO for storage as an IAO based on the determination of an IC, a set of ICs which together represent a Comparative Set based on ICs used as a peer set of equally-sized ICs and a Decision Set, which is the set of the ICs in the Comparative Set organized logically for visual effectiveness based on the relative sizing of the ICs as represented at the logical grouping layer, which in example in FIG. 7, 718, 710, 712, 714, 716, provides a visual grouping that enables the understanding for the user that determined the relationship(s) and IV used in defining the organization of the IAO, and as represents the relative storage model for this group of ICs as an embodiment of the invention.

902 represents the start of the process of creating an IAO representing data with added context and an associated, user-driven IV to determine the characteristics of the IAO as a set of Information Components logically sized based on internal, relative reference within an IAO as an embodiment of the invention

904 represents a looping mechanism for each IAO created as a set of ICs during the process

906 represents the data input with associated context such as name, value, type, parent IAO, relationship, or any other information included with the data component used to build information

908 represents the input or identification of $IV_{Input}$, which is the underlying data value associated with the IC in FIG. 4 406 for base value components or 418 for non-base value components

910 represents the determination of $RV_{IV}$ as the associated assessed level of relevance for this IC relative to other ICs included in the same IAO based on data in FIG. 4 408 for base value components or 420 for non-base value components

912 represents the determination of $CV_{IV,RV}$ as the associated assessed level of confidence for this IC with regard to the accuracy and strength of conviction with regard to the $IV_{Input}$ and $RV_{IV}$ values as it relates to determining the IC's relative IV for the IAO based on data in FIG. 4 410 for base value components or 422 for non-base value components 914 represents the determination of $IV_{Unqualified}$, calculated as $IV_{Input}*RV_{IV}*CV_{IV, RV}$ for the IC for the determination of IV for the IAO based on data in FIG. 4 412 for base value ICs 916 represents the determination of IV, which equals $IV_{Qualified}$, as the associated assessed IV after adjusting for the orientation of IV with the underlying data of this IC for the determination of IV for the IAO based on data in FIG. 4 424 for non-base value components 918 represents the decision with regard to the processing of this IC as part of a base value IAO or as a component of a representative IC for a non-base value IAO 920 represents the affirmation that the IC represents a base value component and is retained as a base value IC component for inclusion within the base value IAO 922 represents the inclusion of the base value IC as a component for reference during the sizing process 924 represents the decision that the IC is not a base value component and is processed for organization by logical layer 926 represents the determination of $LI_{Mass}$, which represents the amount of IV logically associated with a given $LI_{size}$ of 1 LIU in 426 representing IV adjusted for bias and calculated as $IV_{Unqualified}^{Bias-charge}$ 928 represents the determination of $LI_{Size}$, which represents the unit sizing methodology for Comparative Set ICs and associated a value of 1 LIU in 430 based on dat in 426 for non-bas value components 930 represents the determination of $LI_{Volume}$, which represents the representative value of the spatial capacity of IV as depicted visually and calculated using object-specific conventions for the calculation of objects in 3-dimensions according to structure, and in the example sphere, is calculated as $(4/3)*\Pi(LI_{Size})^3$, where $LI_{Size}$ is based on 928 and based on data in 430 for non-base value components 932 represents the determination of $LI_{Density}$, which represents the representative amount of IV as $LI_{Mass}$ per given unit of $LI_{Volume}$ as represented in 432 and calculated as $LI_{Density}=LI_{Mass}/LI_{Volume}$ based on 926 and 930, and based on data in 426 and 430 for non-base value components 934 represents the relative ranking of $LI_{Density}$ as data in 436 based on 932 and based on data in 434 for non-base value components, which ranks based on highest IV representing the 1st IC to be added as a layer of context to build the IAO with ties solved first by IC $RV_{IV}$ relative to other IC $RV_{IV}$ values in the IAO and if needed, second by input order, and applied as the IC $LI_{Size}$+the size of the IAO $LI_{Size}$ 936 represents the ICs processed to create IAOs as 438 based on 934 and data in 438

FIG. 10 represents a flow chart for creating a basic Information Experience as in 122, In 1002 represents the start of the Information Experience process 1004 represents the objective of the Information Experience input to define the Information Value characteristic used in the calculations and visualizations 1006 represents the process of determining how the system should calculate Information Value and is based on a pre-defined mapping of keywords to relevant values, explicit input, default characteristics previously determined and input, or any other way of setting the main characteristics for the Information Experience and represents a formula or formulas understood and agreed to by the user to be relevant to the user for this objective 1008 represents the user's decision to use an existing EXES or to create a new EXES based on a set of characteristics input by the user, and based on the objective and the Information Value characteristics chosen, if the EXES already exists to satisfy the objective then it can be used or the user can be prompted to associate characteristics with the objective by method of explicit identification and input 1010 represents the decision to use an existing EXES, which is retrieved and enabled for the Information Experience 1012 represents the process of identifying and inputting the characteristics, metrics, and related Information Components to be used to establish the environment 1014 represents the user's decision with regard to the unit sizing data values, metric(s), or characteristics of Information Assets to be used as the base value sizing unit, or Logical Information Unit (LIU), for implementation within the Information Experience 1016 represents the user's decision with regard to any one or more data values, metric(s), or characteristics of Information Assets to be used as the characteristic representing the EXES' EXIS1 characteristic, which is represented as an x-axis in a traditional 3-dimensional coordinate system, for implementation within the Information Experience 1018 represents the user's decision with regard to any one or more data values, metric(s), or characteristics of Information Assets to be used as the characteristic representing the EXES' EXIS2 characteristic, which is represented as a y-axis in a traditional 3-dimensional coordinate system, for implementation within the Information Experience 1020 represents the user's decision with regard to any one or more data values, metric(s), or characteristics of Information Assets to be used as the characteristic representing the EXES' EXIS3 characteristic, which is represented as a z-axis in a traditional 3-dimensional coordinate system, for implementation within the Information Experience 1022 represents the user's decision with regard to any one or more data values, metric(s), or characteristics of Information Assets to be used as additional characteristic(s) representing the nth characteristic, where n represents a set of any data, metrics, and characteristics not included in 1014, 1016, or 1018, and can range from 0 to the number of Information Components identified and included in the Information Experience or any data value derived, calculated, or otherwise gathered for inclusion 1024 represents the inclusion of the EXES settings to be used in to the Information Experience process 1026 represents whether the user inputs the IAOs to be included in the Information Experience 1028 represents the decision to enable the system's selection of relevant IAOs from storage based on a predefined pattern of IAOs used to the objective, based on context mappings in the user's or system's Context Profile based on explicit input by one or more users, pattern recognition as commonly used within the same or similar objectives within the Information Set, or derived, calculated, or otherwise gathered based on some form of systematic logic or processing 1030 represents the user's decision to select the IAOs to be used in the Information Experience input by the user 1032 represents the retrieval of IAOs based on the user's input 1034 represents the IAOs retrieved included for use within the Information Experience 1036 represents any biases, environment variables, or other components employed by the user to understand the information and represented as data, information, and contexts provided as Information Components to add elements of relevance to one or more IAOs, the group of IAOs, the spatial, sizing, or other characteristics employed in the Information Experience, which serve to adjust, temper, or create qualifications impact on Information Value or visual processing so as to render the Information Experience more accurate, valuable, reliable, or in an effort to test or run scenario-based analyses

1038 System gathers Information Components from the included IAOs for further processing, calculations, and visualizations

1040 represents the calculation, association, patterns-identification, or other processing of IAOs to satisfy objective subject to constraints such as data and computer processing limits, adjustments to data as represented by Context Qualifiers

1042 represents the process of generating the visual environment of the Information Experience, which includes a 3-dimensional, spatial construct rendered via any applicable and capcable third-party rendering solution such as physics engines and software et al for processing of calculations, rendering visuals, or otherwise serving to help create the Information Experience environment

1044 represents the end of the Information Experience process

Figure 11:
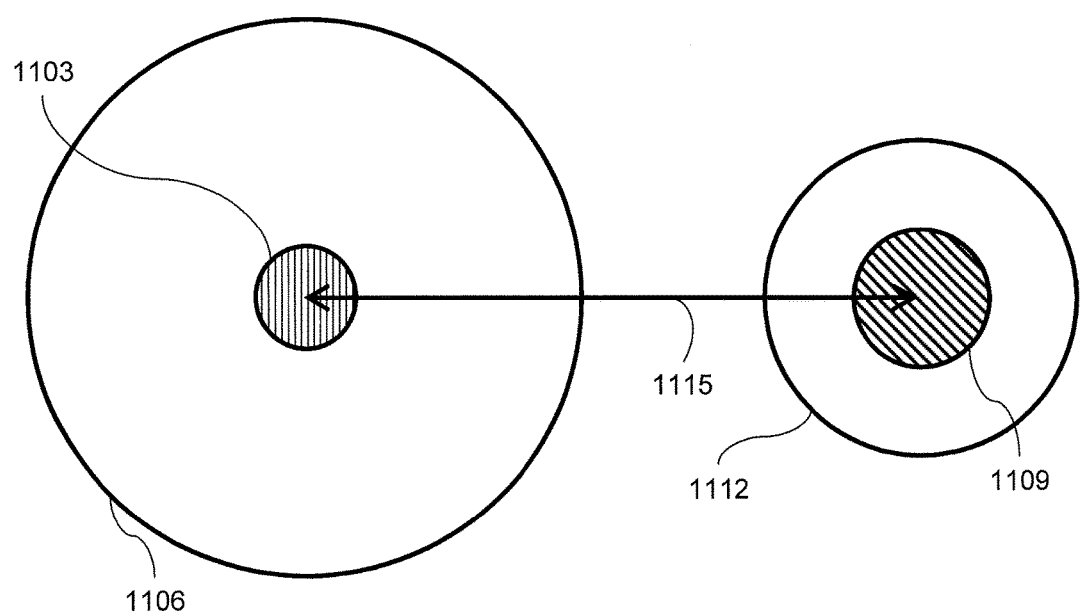
FIG. 11 represents LIGravitational Forces, according to an embodiment of the invention.

FIG. 11 represents LIGravitational Forces which are calculated as $(LI_{Bias1,2}*LI_{Mass1}*LI_{Mass2})/(d_{1,2})^2$, where $LI_{Bias}$=the bias-charge added as an input value, computed from the weighted average bias-charge for $IAO_1$ and $IAO_2$, $LIMass_1$ represents the LIMass in $IAO_1$ and $LIMass_2$ represents the $LI_{Mass}$ in $IAO_2$, and $d_{1,2}$ represents the distance between the two objects based on 3 coordinates as plotted along $EXIS_1$, $EXIS_2$, $EXIS_3$, as in 122, 336, 936

FIG. 11 depicts cross-sections of two sets of concentric spheres with each IAO outer sphere representing company stock, and an inner sphere representing the Valuation Opportunity as determined by the calculation of stock price components and used in LIGF calculations in

1103 sphere represents the IV $LI_{Density}$ as visualized to convey the value as a percent of the total asset size=$LI_{Mass}/LI_{Volume}$, where $LI_{Mass}$=the stock for Stock A: current, high target, historical high, low target, historical low

1106 sphere represents the IAO of Stock A, which represents the current price of the stock

1109 sphere represents the $LI_{Density}=LI_{Mass}/LI_{Volume}$, where $LI_{Mass}$=IV for Stock B:

current, high target, historical high, low target, historical low, which equals

1112 sphere represents an IAO that is interacting with a larger IAO based on data in

1115 arrow represents the bi-directional nature of LIGF, which is the mutual attraction between two IAOs as would be represented in an Information Experience and calculated as LIBias1, 2*LIMass1*LIMass2/(d2)

Figure 12:
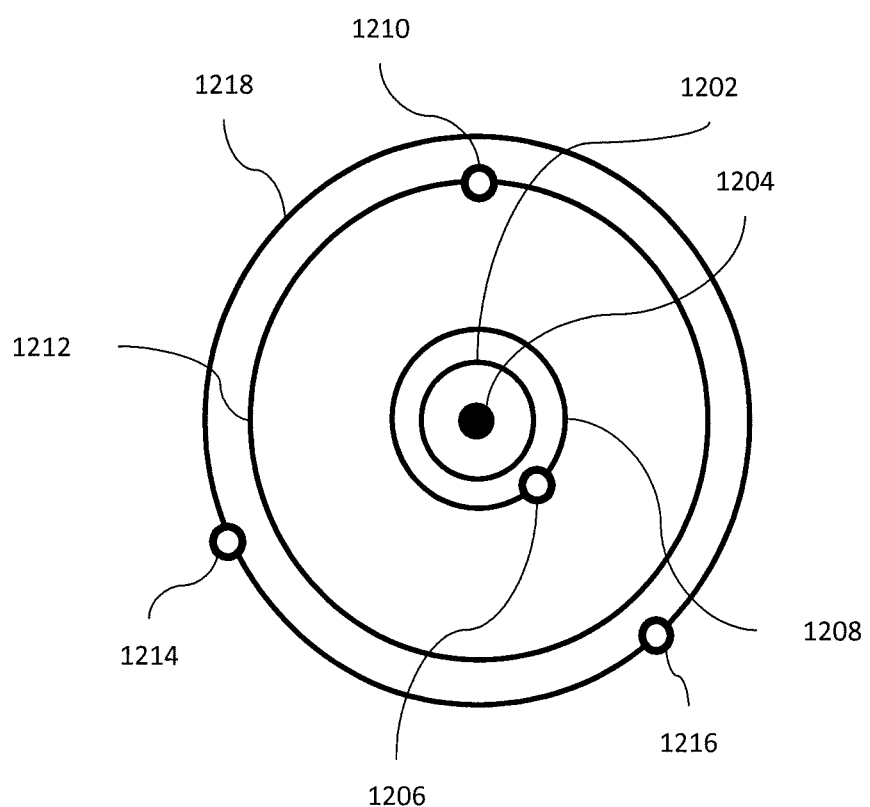
FIG. 12 represents LI Gravity, which provides visual information based on one core, or central IAO, and the interactions of other IAOs as a matter of the amount of gravity, or Information Relevance existing as relationships, according to an embodiment of the invention.

FIG. 12 represents LIGravity, which provides visual information based on one core, or central IAO, and the interactions of other IAOs as a matter of the amount of gravity, or Information Relevance existing as relationships

1202 sphere at the center represents an IAO with relevance to other IAOs in 1206, 1210, 1214 and as determined to be the core decision IAO as the centrally-located IAO around which other IAOs are set to rotate in logical paths, or orbital paths

1204 small, black sphere represents a specific characteristic or component of data for the IAO in focus, which is the centrally-located object deemed to have a relationship with other IAOs in the graphic, and in the example represents the user's level of involvement with the decision as a user-defined input that represents approximately 40% of the representative core decision IAO

1206 represents an IAO indicating there is one IC at that layer of context, or relevance, as determined by the calculation of 1–IC $RV_{IV}$ where IC $RV_{IV}$ represents the relevance value attached to the specific Information Component and with the IC representing the job salary

1208 represents the logical orbital path of one or more Ics as calculated as a series of coordinate points determined based on 1-, 2-, or 3-dimensional IV variables, and in the example represents a 1-dimensional value, $RV_{IV}$, and as a circle of radius $RV_{IV}$ originating at the origin for object as calculated as $4/3*\Pi*LISize3$, where $LI_{Size}$=IC $RV_{IV}$ and using data in 406 represents a close relationship at a distance of 30% of the maximum distance from the origin calculated as of $LI_{Size}$=1–IC $RV_{IV}$ where IC $RV_{IV}$=with orbit sphere size of $4/3*\Pi*LI_{Size}^3$, which equals 0.3*1 LIU

1210 represents an IAO indicating there is one IC at that layer of context, or relevance, as determined by the calculation of 1–IC $RV_{IV}$ where IC $RV_{IV}$ represents the relevance value attached to the specific Information Component and with the IC representing the benefits package

1212 represents the logical orbital path of one or more Ics as calculated as a series of coordinate points determined based on 1-, 2-, or 3-dimensional IV variables, and in the example represents a 1-dimensional value, $RV_{IV}$, and as a circle of radius $RV_{IV}$ originating at the origin for object as calculated as $4/3*\Pi*LI_{Size}^3$, where LISize=IC $RV_{IV}$ and using data in 406 represents a relatively weaker relationship than 1208 at a distance of 80% of the maximum distance from the origin calculated as of $LI_{Size}$=1–IC $RV_{IV}$ where IC $RV_{IV}$=with orbit sphere size of $4/3*\Pi*LI_{Size}^3$, which equals 0.8*1 LIU

1214 represents an IAO indicating there is one IC at that layer of context, or relevance, as determined by the calculation of 1–IC $RV_{IV}$ where IC $RV_{IV}$ represents the relevance value attached to the specific Information Component and with the IC representing the distance from home to the job

1216 represents an IAO indicating there is one IC at that layer of context, or relevance, as determined by the calculation of 1–IC $RV_{IV}$ where IC $RV_{IV}$ represents the relevance value attached to the specific Information Component and with the IC representing the hours worked per week job

1218 represents the logical orbital path of one or more Ics as calculated as a series of coordinate points determined based on 1-, 2-, or 3-dimensional IV variables, and in the example represents a 1-dimensional value, $RV_{IV}$, and as a circle of radius $RV_{IV}$ originating at the origin for object as calculated as $4/3*\Pi*LI_{Size}^3$, where $LI_{Size}$=IC $RV_{IV}$ and using data in 406 represents a relatively weaker relationship than 1208 at a distance of 80% of the maximum distance from the origin calculated as of $LI_{Size}$=1–IC $RV_{IV}$ where IC $RV_{IV}$=with orbit sphere size of $4/3*\Pi*LI_{Size}^3$, which equals 0.8*1 LIU Information Decision represents a decision based on information in a manner that enables the recognition of Information Value allocated to representative Information Asset Objects as an embodiment of the invention Information Component Object (ICO) represents the instantiation of an Information Component for use as an Information Asset Object in an Information Experience, and as an object in the system representing the data comprising the IC is based on underlying IC data, which are attributes of the ICO, and represents any IC that is represented as a "sub-component" of an Information Asset or Information Asset Object as an embodiment of the invention Information Asset refers to the collection of data that when used together represents information; Note that Information Assets can be comprised of other Information Assets or Information Components Information Asset Object (IAO) refers to the objectification of a set of data that comprises an Information Asset as an embodiment of the invention; Note that Information Assets can be comprised of other IAOs and contain at least one ICICs.

Characteristic refers to the relationship of data and information with regards to one or more specific properties of an Information Asset Object Value refers to the amount, score, or associated reference for an Information Component, or refers to the perceived level of benefit versus cost, or refers to the perceived worth of something Information Value is the assessed value of any IC based on a value, the perceived level of importance, and the perceived level of confidence in the assessments of IV and RV in determining the perceived worth, where value is subjective, and calculated as $IV_{Input}*RV_{IV}*CV_{IV,\,RV}+CQ$, or as $(IV_{Input}*RV_{IV}*CV_{IV,\,RV})^{Bias\text{-}charge}+CQ$ of an Information Component as an embodiment of the invention Highest Value refers to the Information Value that represents the greatest amount of positive value or least amount of negative value to the user; Note value can equal quantitative or qualitative values Lowest Value refers to the Information Value that represents the least amount of positive value or greatest amount of negative value to the user; Note value can equal quantitative or qualitative values Information Valuation refers to the process a user would use for determining the inherent value of data, information, context, or object after consideration and assessment (NO)

Valuing refers to the process of determining the value of data, information, context, or object in raw or adjusted form used in the process of determining Information Value Relevance Value, abbreviated $RV_{IV}$, refers to a specific determination of the relevance or importance of an Information Component to the Information Value of an Information Asset Object within which the Information Component is a component of data as compared to other Information Components also within the Information Asset Object, and is a component in the calculation of Information Value as an embodiment of the invention.

Confidence Value represents a level of confidence with regard to the assessments of the Information Value and Relevance Values as applied to data during the process of determining Information Value, and represents the user's "scoring" of the user's ability to intellectually process the data into information based on relevant understanding and experience, and then to the assigned values or Information Decisions made with regard to research and analysis, which are input as information from the user's specific perspective; In essence, this is the user's scoring of her/his ability to correctly assess, determine, and describe the data and information, and to apply a fair and accurate value for the importance of the data and information used in the research, analysis, and decision processes.

Information Integration represents the process of quantifying qualitative values and to integrate qualitative values with quantitative values by implementing the Information Value capabilities in 2, above, to create quantified scores/values for user-assessments of information and by employing scales, opportunity cycles, and explicit, absolute values among other methods of associating assessments with scalar or vector quantities, which are input and integrated with a set of data used in the research, analysis, and decision processes, and are enabled for visual understanding and intuition, specifically, an Information Component may be qualitative, quantitative, or based in any perception, sense, or communication mechanism, and can be objective or subjective, general- or user-specific in nature, but when used with other relevant ICOs within an Information Asset Object, Comparative Set, and/or Information Set can be assigned an Information Value that represents an Information Decision with regard to the effectiveness, value, or other understanding of the information Scale refers to a mechanism that enable the association of quantitative value with a qualitative value based on reasoning, specifically, scales can be implemented as tools to produce binary, multifaceted, or relative values based on a specific set of potential values as determined by the user, and with the potential to be applied to one or more Information Components in a similar manner as decision aids and enable the; Additionally, multiple inputs and/or multiple outputs may be aligned based on a user's specific judgment with regard to the score, value, or other assessment of one or more Information Components and are used as to create commonality, direction, magnitude, and relative value; In essence, scales are utilized to provide a common scoring value mechanism for the user's opinion of one or more Information Components such that the value determined can be integrated as a quantified value within a set of information during the research, analysis, and decision processes Opportunity Cycle refers to a mechanism for associating Information Value with non-standard data as a relationship between a logical, reference scale and the user's assessment of a score or value relative to the reference scale that when employed, creates a logical Information Value association based in user understanding to enable the user's ongoing understanding and Information Valuation of one or more Information Components as it relates to the user's interpretation of the status or state of an Information Component based on the Information Component and the reference scale's corresponding Information Value, which is based on common, or user-driven identifications of cyclical or characteristics-based patterns; Opportunity Cycle refers to user-driven tool, which enables the capture of any set of Information Components designated as a group of potential outcomes in an Information Decision and the corresponding application of a representative Information Value approximation or equivalent to provide reference for ongoing associations of information and Information Value in a similar and predictable manner Absolute refers to the constancy of an Information Component Absolute values refer to those Information Components, usually data that are used as a constant, not variable value Relative refers to the relationship of two or more Information Components where at least one Information Component can serve as a base of comparison for one or more other Information Components to reveal or highlight commonality or difference, which can be shown visually as based in direction, magnitude, or both as an embodiment of the invention; this can be a thought, data, or object that is viewed in combination with one or more other components in the understanding or processing of data into information- Subjective Assessments refer to a user's specific opinion, thoughts, or other decisions as applied to data and information with regard to one or more Information Components or information that are the user's own identification for the Information Component or information Information Objects: Mechanism that utilizes formulas to enable identification, valuation, association, organization, and visualization of information as unique Information Asset Objects Information Asset Object (Information Asset) is a mechanism provided to accumulate logically data relevant to information and to incorporate those data or references to data into a logical grouping used in storing the data, referencing properties of the combined logical grouping of data, and rendering of the data programmatically within an Information Experience based on relevant and related ideas, perspectives, or other analytical insights used in the research, analysis, and decision processes, additionally, the Information Asset is established to provide a relevant object model for the accumulation of data available for generally- or user-specific consumption of information with Information Assets that represent real-world or other non-user-specific items such as people, places, or things available to one or more groups of users in the system as generally available, and those specific responsible for the logical creation of the logical grouping of relevant information General Information Assets include those created by the system, those created by a specific user or group and released as available for the entire user base, and for those objects that are deemed "not owned" by one specific user or group as they mirror objects, processes, or other real-world items, which are stored logically as a generally-available Information Asset Specific Information Assets include those that are created specifically by a use or group for a specific purpose or focus such as a logical grouping of user-defined, relevant Information Assets into a user-specific group based on perceived relevance, or desired inclusion as a set of Information Assets, and user-specific logical associations made to a specific Information Asset or Information Component within an Information Asset are stored as user-specific context in the user's Context Profile, which is a logical grouping of a user's preferences, patterns of use, metadata, explicit and implicit relationships established, and experience, intuition, and usage levels among other user-specific characteristics Objective data refers to data with a basis in fact and having no basis in user influence Objective input refers to objective data, or data based in fact and without user influence Information Objective refers to the user's goal in an analysis entered as input during the process of visualizing information in relevant contexts to derive Information Value of one or more Information Assets in an Information Experience EXES is a mechanism that enables the logical grouping of spatial characteristics and desired information research, analysis, and decision processes to create a characteristics-based medium for the reuse of criteria when executing an Information Experience; Additionally, the EXES differs from the traditional spatial Axis concept in traditional 3-dimensional programs due to the nature of encapsulation, which for an EXES refers to the maintenance of relevant characteristics into one logical container stored to provide a consistent view of information to provide generally- or user-specific understanding and intuition; In essence, EXES represents the environment contexts in which the user desires to understand the data as information and enhance intuition EXIS refers to one of three primary components of an EXES, and are similar to traditional 3-dimensional spatial models except that they convey information specific to a user, one or more Information Assets, and an Information Experience and which are stored logically as components of an EXES Valuation refers to the assignment of a value or score to one or more Information Components utilized to promote understanding of a group data and information contained logically as an Information Asset Object, and additionally, the term refers to the value inherent in the Information Asset Object on an intellectual level as used in the research, analysis, and decision processes Association refers to the logical and intuitive grouping, aligning, or other way of developing relationships among Information Components and/or Information Assets to assign meaning as information Organization refers to the logical structure of the Information Components such that one or more user may derive value from the logical associations of Information Components in building understanding Context layer refers to a specific component of context as a relatively higher level, or parent level, or relatively lower level, or child level, of context, the organization of which can include multiple layers of sub-context within sub-context for the purposes of logical objects grouping based on one or more Information Components used to represent an IAO Information Visualization refers to the understanding and intuition enabled with the use of visually rendered objects and cues such as spatial relationships, size, and movement, among many others that promote a user's identification of information from the processing of underlying Information Components (data)

Information Storage represents a storage mechanism that effectively stores relative references if applicable, which are specific to each combination of period of data capture or reference, metric, data, or value, Information Component, Information Asset, Information Asset Object parent objects, which represent higher context layers, Information Asset Object child objects, which represent ICOs to an Information Asset Object, and other information such as assessments of the environment in which research, analysis, and decisions are made, and can include any impactful Information Component as determined by a specific user utilizing a rolling percentage or prior recognized value approach in a process of "Contexting and Decontexting" values so that only relative references are maintained; Importantly, the process of Contexting serves to provide a unique and efficient manner in which to store data as its data footprint is much smaller and enables quick comparisons and use within Information Experiences, which provide relatively high learning value when making relative discoveries during the visual research and analysis processes Contexting refers to the process of logically packaging the information into a compact form based on relative references; Specifically, if a metric or other use of similar data relevant to a specific Information Component or Information Asset is not already stored within the system, the relative reference used in the Contexting process would be to apply a base period and value for the highest level group of related data being stored logically, or the Information Asset Object to which the Information Components belong, which is then used to serve as a "base" value for other components in manner that creates a group of Information Components that when combined, equal to 100% of the information being stored Decontexting refers to the process of "re-inflating" the Information Components from the Contexting state by applying the relative percentages of each Information Component to the "base" value to reconstruct the value in its actual state versus its stored relative state Information Experiences: Information understanding and intuition via visualization using formulas, models, Information Context, associations, and Information Assets in a spatially-distributed, 3-dimensional (can also be applied to 2-dimensional views of information) computer-rendered, object environment Information Experience refers to the programmatic execution of code to render visually one or more logical groups of information (Information Asset Objects) in manner that provides specific understanding based on spatial position recognition, size, movement, and other visual and audible characteristics and cues; Specifically, an Information Experience is the programmatic combination of Information Assets, environment and characteristics (EXES), and a user's specific understanding to create a virtual 3-dimensional view of information, which is comprised of Information Components (data) brought together at run-time to enable a computer-generated window of imagery via objects, relationships, and involving concepts such as attraction, repulsion, and other relevant scientific, information domain, or user-specific actions and inputs LIBias refers to any tendencies for an Information Asset Object to allow for the influence of one or more data, characteristics, or attributes in an Information Experience in a manner that exerts influence on the outcome of an analysis, and calculated as the (LIBiasG*RVLIBiasG*CVLIBiasG)*(LIBiasS*RVLIBiasS*CVLIBiasS), where, LIBiasG=a general bias relating to one or more external Information Asset Objects or characteristics defining an Information Experience EXES Logical Information Gravitational Force, or Logical Information Gravitation, refers to the Logical Information Gravitational Force that occurs between the one IAO and another IAO based on Information Value as captured in the Logical Information Mass and the Logical Information Volume attributes of each IAO and calculated as (LIBias*LIMassi and LIMassj)/d2 as an embodiment of the invention Logical Information Gravity Logical Information Gravity is the force acting to pull Information Asset Objects toward one specific IAO Information Context refers to the logical associations of conditions related by a user to a specific Information Asset or the contexts in which the Information exists; Specifically, Information Context represents the data logically associated with an Information Component included in an Information Asset Object as an attribute as one or more specific variables, or other Information Components that affect, impact, interfere with, or otherwise provide value to the research and analysis of the Information Asset; Additionally, the Information Context includes data and information deemed to be relevant to the research and analysis of the Information Asset Object Environment refers to the run-time execution of code that generates objects from logical groupings of data within a window of similar conditions Information Context Sharing, Collaboration, and Best-practices represents the enhancement of user experience by identifying patterns of context usage and application by user, logical group, or Information Asset Object, including Information Experiences Information Context Sharing refers to the logical grouping of a set of Information Components into one logical Information Asset that is generally available to more than one user based on rights, permissions, and experience levels of the user, and is maintained generally by the level of context enabled for each user or group; Further, once the Information Asset is accessed by another user, any input and/or data, information, and context associations added by the new user, that user's additions are maintained specifically for that user unless explicitly enabled by the user for one or more other users or groups of users, but which for the new user is always included when the Information Asset is recalled Collaboration refers to the combine activities of users with an objective of meeting one or more goals Information Collaboration represents the enablement of joint use of an Information Asset and is used by maintaining separate contexts for each user with each user's inputs, additions, etc. maintained specifically separate for the specific user unless otherwise explicitly enabled in the system, and then enabling the joint recognition of one or more user's inputs into the generally-available Information Asset Best-practices refers to the process of incorporating the general agreement in essence of those practices, knowledge, or patterns determined by usage to be the most effective process in which to achieve an objective based on similar goals and resources; Specifically, Best-practices refers to the process of identifying, based on usage patterns, which includes user, group, Information Asset(s), environment, etc.

Information Context Management represents the process of mapping keywords, phrases, expressions, and values from among components of data, information, and user-specific opinions, interpretations, and understanding as Information Context (Keyword/phrase Maps, Intuition Engine, Intuition Processing, Context Maps), which provides for the association of specific contexts with users, information, and a reference medium representing an Information Context Chart of Accounts.

Intuition Engine represents the processing of data in a manner consistent with the objectives of reducing the amount of data while preserving or adding value to data in the form of context by associating patterns with data as determined by one or more users, or based on patterns identified using analytical evaluations of common data relationships, occurrences, frequency, among other factors Intuition processing represents the processing of data into context by recalling patterns of usage, common words, phrases, or data associations as interpreted by the system based on prior usage or explicitly by a user based on the user's personal perception of the meaning, which can then be cross-referenced with those based in other users' interpretations to enable an accuracy score, rating, or value, which can then be shown and/or enabled for user research in an effort to improve performance and ensure consistency Mapping refers to the process of creating a key-value relationship for data in a manner consistent with the nature of the Information Component or Information Asset as determined programmatically based on patterns of usage, explicit instructions, or other particular function as necessary to promote the establishment of base levels of commonality for frequently encountered or user-driven information contexts, and refers to the processing of parsing data in part and in whole into a set of Information Components and associating each Information Component with other Information Components, context, and values representing Information Value Mapped refers to the action of mapping data input (verb) or to the post-processed state of information based on the data input (noun)

Context Map refers to a mechanism to enable the programmatic relationship between an Information Component and specific context relevant to a user; Specifically, a Context Map applies the user's assessment of value to an Information Component generally considered non-standardized context for that Information Component, or key, in its place to derive standardized data for ease of reference, building or refining context patterns for the specific user, a group of users, and/or enablement for system-side usage, and for calculations involving non-numeric data.

Context Mapping The process of creating a key-value dictionary pair to be used as a reference for the translation of non-standardized data to standardized data Context Chart of Accounts represents a system for managing the storage of common keywords, phrases, associations, and relationships among Information Components that is enabled by the processing of data and context input by a user and referenced against the list of double-entry, key-value pairs where an increase in one set of values is equally offset by an increase, or negative decrease, in an associated value to maintain Context Chart of Accounts equilibrium Information Security refers to the inherent benefits of enabling user-specific information stored as a set of user-driven information built from data in user-specific contexts and with references to system objects versus storing actual user dataelative information stored as information in context and relevant to each specific user provides lower value in theft as a thief would need to replicate the user's contexts to enable theft of data value, therefore, the concept naturally aids in information security and places less relative importance on the need for maintaining and securing general data; Specifically, each user's specific point of view, opinion, reference, and understanding with regard to an Information Component or Information Asset is unique based on that user's prior experience with the information, understanding, and interpretation of the underlying data and conditions in which the data exists or existed at a precise moment and as such, creates context that when stored is maintained separately from the actual Information Asset, but rather, only with a reference to the Information Asset, which provides for a layered approach to maintaining the user's intellectual property represented as context; Additionally, because every Information Component within the system is itself a potential logical object within the system, the underlying data maintained logically as an Information Asset, the environment in which a user analyzes data (Information Experience and EXES), and the information built on the data (context) and the processing is stored logically as separate associations; In essence, the information stored for a user is that user's relative references to other objects within the system and not values themselves, which makes the process of data discovery, if stolen, a challenge to recreate.

Context Qualifier (CQ) represents the Information Value adjustment made based on input, derivation, or calculation, used to approximate a 10% increase or decrease in Unqualified Information Value ($IV_{Input}*RV_{IV}*CV_{IV, RV}$); a qualitative example could include how often a user stresses value, for example, in using "very" with base values is factored into the user's Context Profile across user assessments where "very" or other Context Qualifiers are enabled and would be used to discount applications of CQ based on the accuracy (Using CQ was correct/all occurrences of using CQ)

Unqualified Information Value ($IV_{Unqualified}$) represents the Information Value after applying relevance value and confidence value to data input value, or IVInput, but before adjusting for any Context Qualifiers, and calculated as $IV_{Unqualified}=IV_{Input}*RV_{IV}*CV_{IV, RV}$ Qualified Information Value ($IV_{Qualified}$) represents the Information Value after applying relevance value and confidence value to data input value, or IVInput, and after adjusting for any Context Qualifiers, or, and calculated as $IV_{Qualified}=IV_{Unqualified}+$Context Qualifiers Logical Information Gravity Value, (GVL) represents the level of importance within and among Information Assets to be used to determine relational contexts, sustainability of value, and other components deemed important to the understanding of information as an embodiment of the invention.

Logical Information Gravitational Reliance represents the process of constructing or deconstructing the Logical Information Gravitational Value for one Information Asset Object based on its relationship(s) with another Information Asset Object as represented by the underlying relationship(s) between informational characteristics and as determined by the impact made on one by the other such as revenue in a supplier-customer relationship where the percentage of total revenues for the supplier is a direct function of its customer-specific revenues or vice-versa, or the number of transactions for a call center related to a satisfaction score for the representative, call center, and/or company, among other information relationships based on context as an embodiment of the invention.

Information Origin, or "Origin" represents the association of a specific coordinate with the exact center of an Information Asset Object as determined by the intersection point among the three characteristics and the center of the Information Asset Object's center as determined by the IAO's $LI_{Mass}$ and which is equivalent to the concept of an origin for a two-dimensional circle, three-dimensional sphere, or three-dimensional cube, for example, as an embodiment of the invention.

Logical Information Gravity Center, or "Gravity Center" represents the location (coordinate) of the center of mass for an Information Asset Object, which in a uniform Information Asset Object would equal its Information Origin, as used within gravitational calculations as an embodiment of the invention.

Logical Information Speeds Limits Contextrepresents the specific rates at which the system is capable of processing "waves" of data into levels of understanding within the system as it associates the specific data with information in a context that is recognizable and valuable to a user as context, but is based on a combination of calculations, user- and system-supplied functions, and with the overall information knowledge and understanding within an information set as an embodiment of the invention.

The concept of Logical Information Set, or "Information Set", which represents the logical grouping(s) of data, information, and/or context as determined to be relevant to the understanding, knowledge, and intuition as defined by one or more users of the information within a body of data, information, and/or context and as could be applied to the research and analysis of a topic or subject as an embodiment of the invention.

Logical Information Value (LI) represents to provide a value placed on a logical Information Asset Object of Information Asset Component Object that can be used to provide characteristics and properties similar to physical properties such as mass, velocity, weight, volume, etc. as specific values as determined consistently across an Information Set or as used in an Information Experience as an embodiment of the system.

Logical Information Mass Value ($LI_{Mass}$) represents the weight, value, relevance, Mass, and/or importance of information as it pertains to the understanding of information as depicted as an Information Asset within an Information Experience as an embodiment of the invention.

Logical Information Velocity Value ($LI_{Velocity}$) represents the direction and magnitude of Information Assets as calculated utilizing system concepts and formulas as an embodiment of the invention Logical Information Volume Value ($LI_{Volume}$ represents the "size" of an Information Asset as embodied within the invention, in a manner consistent with the understanding of a 3-dimensional object depiction within the physical sciences models. This is dependent upon many variables, Information Gravity, and user- and system-preferences, among other context development mechanisms as an embodiment of the invention.

Logical Information Momentum Value ($LI_{Momentum}$ represents the momentum of an Information Asset as embodied in the invention, in a manner consistent with the understanding of the object's momentum calculation within the physical sciences models and the enablement of its 3-dimensional, visual depiction. Specifically, this is the Logical Information Mass times the Logical Information Velocity as related to information as an embodiment of the invention.

Logical Information Density Value ($LI_{Density}$ represents the amount of informative "matter" within a confined logical boundary as represented by spatially distributed Information Assets within an Information Experience as an embodiment of the invention.

Logical Information Size, or "Size represents the visual depiction of the boundaries of an Information Asset Object within an Information Experience as an embodiment of the invention.

Logical Information Weight, or "Weight represents the real-world, physical equivalent of weight into calculations, interactions, and Information Value for an Information Asset Object within an Information Experience as an embodiment of the invention.

the concept of Logical Information Component, which represents the quantified value or score of one or more components, in whole or in part, of data, information, and/or context as an embodiment of the invention.

Logical Information Unit ($LI_U$ represents the measure, and representative per unit value, orientation, charge, and/or characteristic as a single unit of measure, or metric, designed to enable the standardization of values within/between/among one or more Information Assets by creating unit values, which can be mathematically applied to create values and scores that represent a functional measurement or scaling basis and used to represent one or more data, information, and/or context items, Information Assets, groups of Information Assets, information sets, and/or information items available for analysis ("Logical Information Component). For example, units can represent dollars in a financially-oriented Information Experience such as that used within a financial information set, a beverage count if used in a socially-oriented Information Experience, and/or any and metrics, measurements, internally or externally presented as quantifiable scores or values of any relevant information set or Information Asset Object as an embodiment of the invention.

the formula for calculating the Logical Information Unit ($LI_U$) as an embodiment of the invention as:

$LI_U$=Logical Information Component/Scaling Mechanism Structural Unit where $LI_U$=one unit of the Logical Information Component Logical Information Component=a specific reference to data, information, and/or context as a quantified and represented as a value or score Scaling mechanism structural unit=the divisor in the computation of the Logical Information Unit, which is used to provide a base unit metric foundation for a measurement vehicle used in the standardization and quantification of subcomponents of an information component value or score Logical Information Mass per Unit of Logical Information Volume ($LI_{MpU}$), or Logical Information MpU, a mechanism to capture/measure the relevance, value, importance, weight, and/or other ways, subjectively or objectively, of quantifying and associating a score or value with information within one or more specific Information Asset Components, Information Assets, groups of Information Assets, multiple groups of Information Assets, Information Assets in one or more information sets, and/or any and data, information, and contexts in part or in whole that are available for analysis ("information items") to be derived from, or to drive a direct function of Logical Information Volume based on the total Logical Information Volume per one unit of spatial volume in an Information Experience; Specifically, the $LI_{MpU}$ represents a quantiative value associated with the same information item and provides a value, score, or metric that can provide an input to the calculation and understanding of an Information Asset's Logical Gravitational Value, Logical Information Value, Logical Information Density Value, and other Logical Information mechanisms to convey specific, derived characteristics of data, information, and/or context that convey the strength, durability, relative winner and loser, patterns analysis components, and systematic variables information of data, information, and/or context based on the "amount" of mass within the information contained within a given unit of volume as represented by characteristics of the data, information, and/or context. Logical Information Mass per Unit of Logical Information Volume can be derived from one or more of the following: data, information, and/or context values for Mass and Volume; a score derived from a scale applied subjectively or objectively; based on usage patterns of similar users of the data, information, and.or context; based on relative value levels as applied to a uniform or non-uniform scale; based on Logical Information Density; or other.

the formula to calculate the Logical Information Mass per Unit of Logical Information Volume ($LI_{MpU}$) as an embodiment of the invention:

$$LI_{MpU} = LI_{Mass}/(LI_{Volume}/LI_{Units})$$

where, $LI_{MpU}$=Logical Information Mass per Unit of Logical Information Volume at a specific logical level, as represented visually in an Information Experience by the size or other characteristic of the object $LI_{Mass}$=Logical Information Mass of the Information Asset Object at a specific logical level, which acts as a form of a Context Qualifier for data, information, and/or context within a specific Information Asset Object.

$LI_{Volume}$=Logical Information Volume of the Information Asset Object defining the size of a specific logical level as represented in the Information Asset Object's size as visually observed within an Information Experience.

$LI_{Units}$=Units type and/or number, which can be based scalar or vector in nature and based on data, information, and/or context in the Information Experience, one or more subjective and/or objective measures, drawn directly from a calculation based on the number of layers "levels" of Context in the Information Experience, it can be derived from the relationship between, or other subjective measures.

the Formula for calculating the Value Gravity of an Information Asset Object, or Information Gravity Value (Gvf) Based on Forces, which determines the value of an Information Asset Object ("Object") based on the confluence of inward and outward forces impacting the Object plus a region within the Object that determines the Object's ability to maintain its size and shape that provides a layer of "insulation" up to the Object's outer surface, and used to identify the gravitational footprint of the object as an embodiment of the invention:

$$Gvf = V\text{Outward} - V\text{Inward} + V\text{Insulation}$$

where, Gvf=Value Gravity for an asset
VOutward=Value of the "information controllables" "pushing out" from inside the Information Asset
VInward=Value of "information un-controllables" "pushing in" from outside the Information Asset
VInsulation=Value of Information Asset's ability to defend itself from outside forces the formula for calculating the Value Gravity of an Information Asset Object, or Information Gravity Value, based on the Information Asset's information (Gvai), which determines the value of an Information Asset Object ("Object") based on one or more concentric spheres representing levels/layers of information context and the sizes of which are determined by data at each level/layer of context, and used to identify the gravitational footprint of the object as an embodiment of the invention:

$$Gvai = V\text{Current Information} + V\text{Potential Information} + V\text{Insulation}$$

where, Gvai=Value Gravity for an Information Asset based on the Information Asset's information context
VCurrent Information=Value of the known information for an information analysis
VPotential Information=Value of the potential information for an information analysis company
VInsulation=Value of Information Asset's ability to defend itself from outside forces Therefore, mathematically, using substitution, we can derive Gv as an embodiment of the invention as follows:

$$V\text{Current Information} + V\text{Potential Information} = V\text{Outward} - V\text{Inward}$$

the formula for calculating the Value of Gravity for an Information Asset Based on Execution Foundation as an embodiment of the invention:

$$Gve = V\text{Resources} + V\text{Decisions} + V\text{Insulation}$$

where, Gve=Value Gravity for an Information Asset based on its Execution Foundation
VResources=The internal resources a company uses to generate value
VDecisions=The internal decisions a company makes to generate value
VInsulation=The unique application and enhancement capabilities that enable an advantage Therefore, we can rewrite the following as an embodiment of the invention:

$$V\text{Current Information} + V\text{Potential Information} = V\text{Outward} - V\text{Inward} = V\text{Resources} + V\text{Decisions}$$

Logical Information Gravitational Value, $LI_{GV}$, or Logical Information Gravity Value ($LI_{GV}$), a mechanism used to represent an Information Asset's Gravitational Value based on the Logical Information Value of one or more Information Asset Object values contained within a specific, spatial volume as represented visually, that determine the gravitational attractiveness of the Information Asset Object within an Information Experience as an embodiment of the invention:

$$LI_{GV} = LI_{MpU} \text{ Logical Information Mass per Volume Unit at Logical level } n * \text{Logical Information Volume Units at Logical Level } n$$

where, $LI_{GV}$=Gravitational Force of a specific Information Asset Object at the nth logical level
=$LI_{MpU}$=Logical Information Mass per Volume Unit at Logical level n Logical level refers to the association of data in context as containing specific components that are embodied through contextual understanding as information context and sub-contexts, which when combined enable the understanding of information as a value or visual representation n=the value of the IC represented within an IAO based on its relative positioning as determined in and in 932, 934, and 936 and with its positioning within an IAO, or the representative logical layers number, representing one or more levels of context as a set of concentric sub-contexts as visualized within the Information Asset Object the formula for calculating an Information Asset Object's Logical Gravitational Value ($GV_{Liac}$), based on Information Value by Component, which determines the units-based Logical Information Mass for an Information Asset by utilizing characteristics representing the visual characteristics of object volume and the Logical Information Density Value of the "matter" in the Information Asset Object as an embodiment of the invention $$GV_{Liac} = LI_{M/VU} *$$

where, $GV_{Liac}$=the Logical Gravitational Value of an Information Asset Object
$LI_{M/VU}$=Logical Information Mass per Volume Unit, as represented visually in an Information Experience as the size of the object
$\text{Units}_{Volume}$=Volume Units the formula to calculate the Value Gravity Premium ($V_{Gprem}$) as an embodiment of the invention $$V_{Gprem} = (V_{Outward} + V_{Insulation}) / V_{Outward}$$

where
$V_{Gprem}$=Premium value associated with the gravity of the outward forces and the sustainability of the value associated with the insulation layer
$V_{Outward}$=Value of the "information controllables" "pushing out" from inside the Information Asset
$V_{Insulation}$=Value of Information Asset's ability to defend itself from outside forces the formula to calculate the Logical Information Gravitational Force ($GV_f$), between two Information Asset objects $$GV_f = (S_c * LI_{Mass1} * LI_{Mass2}) v d^2$$

where, $GV_f$=Logical Information Gravitational Value between two Information Asset objects in an Information Experience
$S_c$=specific tendency or bias in the information when analyzed based on commonalities, standard estimates, or other variables acting as a constant within an Information Experience, and can originate from general, or external Information Asset Objects, or from specific, IAO-internal ICOs, represented as $LI_{Bias\ and}$ substituted for $S_c$ in the equation
$LI_{Mass1}$=the Logical Information Mass in Information Asset 1
$LI_{Mass2}$=the Logical Information Mass in Information Asset 2

$vd^2$=represents the distance between the information assets at their centers, squared.

$$LIBias=LI_{BiasG}*LI_{BiasS}=LI_{BiasG}*RVLI_{BiasG}*CVLI_{BiasG})*(LI_{BiasS}*RVLI_{BiasS}*CVLI_{BiasS})$$

where, $LI_{BiasG}*LI_{BiasS}$=the Information Value of the general bias*the weight of the general bias relative to the weight of the specific bias+the Information Value of the specific bias*the weight of the specific bias relative to the weight of the general bias where specific bias=1−general bias LIBiasG=a general bias relating to one or more external Information Asset Objects or characteristics defining an Information Experience EXES where, $LI_{BiasG}$=a general bias relating to one or more external Information Asset Objects or characteristics defining an Information Experience EXES where, $RVLI_{BiasG}$=the relevance of the general bias $CVLI_{BiasG}$=the confidence assessed with regard to the assessments of the Information Value of the general bias and relevance of the general bias $LI_{BiasS}$=a specific bias relating to one or more internal ICOs or characteristics defining an Information Experience EXES where, $RVLI_{BiasS}$=the relevance of the specific bias $CVLI_{BiasSG}$=the confidence assessed with regard to the assessments of the Information Value of the specific bias and relevance of the specific bias.

Information Asset Component Object, a mechanism to depict a recognized component of data, information, and/or context as an Information Asset as embodied within the invention.

The formula for calculating the Information Value of an Information Asset Object ($V_{IAO}$) as derived from the sum of the Object's component values as an embodiment of the invention:

$$V_{IAO}=\Sigma V_{LcI1}+V_{LcI2}+\ldots+V_{LcI2}$$

where, $V_{IAO}$=the value of an Information Asset Object as derived from the sum of the values of components of value in the Information Asset Object $V_{LcI1}$=the value of the 1st component of the Information Asset Object as can be represented visually as the first concentric layer or as a sub-component spatially located within the Information Asset Object.

$V_{LcI2}$=the value of the 2nd component of the Information Asset Object as can be represented visually as the second concentric layer or as a sub-component spatially located within the Information Asset Object.

$V_{LcIn}$=the value of the nth component of the Information Asset Object as can be represented visually as the nth concentric layer or as a sub-component spatially located within the Information Asset Object.

the formula for calculating the Value of Information in Context, or Information Context Value, ($IC_v$) as derived with the analysis of two Information Assets as an embodiment of the invention:

$$IC_v=(EXP*vc_1*vc_2)/ic_s^2$$

where, $I_v$=Information in Context Value between information in a Universe

EXP=Specific tendency or bias in the information when analyzed, "G"

$vc_1$=the Value of Information in Context in Asset 1, analogous to "mass"

$vc_2$=the Value of Information in Context in Asset 2, analogous to "mass"

$ic_s^2$=distance between the information assets at their centers, squared the formula for determining/deriving the Value of Information in Context, or Information Context Value, as derived with specific knowledge and experience as an embodiment of the invention:

$$IC_v=V_I+V_{Dpi}-C_{Dpn}-C_t-C_u$$

where, $IC_v$=Information Context Value
$V_I$=value of certain information
$V_{Dpi}$=value of information potential in data
$C_{Dpn}$=cost of noise potential in data
$C_t$=cost of the time utilized to classify the data
$C_u$=cost of uncertainty in the decision an formula for calculating the Information Context Value ($IC_v$) refined for net cost of data as an embodiment of the invention:

$$IC_v=V_I-C_D-C_t-C_u$$

where, $IC_v$=Information Context Value
$V_I$=value of certain information
$C_D$=cost of data, the net of CDpn less VDpi in the above equation, expressed as data
$C_t$=cost of the time utilized to classify the data
$C_u$=cost of uncertainty in the decision the formula for calculating the cost associated with expending time to transfer information from uncertain to certain as applied in the decision process as an embodiment of the invention:

$$C_{tc}=C_{torig}+C_{tinc}-V_{udec}$$

where, $C_{tc}$=cost of the time utilized to classify the data
$C_{torig}$=cost of time required to originally classify the data as information, data, or uncertain
$C_{tinc}$=cost of time that has passed since the classification of the data as information, data, or uncertain
$V_{Udec}$=value of the reduction (decrease) in uncertainty the formula for Estimating the Cost of Data as an embodiment of the invention:

$$CD_{estimate}=(CI_u-(CD_{cl}*C_t*cl))-(VI_u-(D_{cl}*C_t*cl))$$

where, $CD_{estimate}$=Estimated Cost of Data
$CI_u$=costs associated with uncertain information
$VI_u$=value of uncertain information
$CD_{cl}$=costs associated with data classification
$C_t$=time required to classify data as noise, information, or uncertain
cl=confidence level, which is a user or System-generated value associated with the confidence in the allocation and classification of data the formula for calculating the Cost of an Error in the classification or estimation of information in the information decision process as an embodiment of the invention:

$$C_e=C_t+C_m+C_r$$

where $C_t$=costs associated with the time required to come to the erroneous decision
$C_m$=costs associated with the mis-diagnosis, mis-classification, and/or mis-estimation of data in the process of developing understanding, knowledge, and intuition with regard to information analysis
$C_r$=costs associated with the repair or otherwise enact corrections to remove erroneous information contexts from the user's and/or the System's knowledge base within an information set The formula for calculating the Value of an Error in the Information Decision process, $V_e$, as an embodiment of the invention:

$$V_e = V_k - V_a - V_I$$

where $V_k$=value obtained via the understanding and knowledge inherent in the discovery, understanding, and incorporation of the error in the decision process, which entails finding and understanding the error $V_a$=value of the ability of the decision to be incorporated into the knowledge base for the user's and/or System's use within the specific context and information set, which entails incorporating the error into future decisions in the same context $V_I$=value implicit in the user's and/or System's incorporation of the error as learning into a greater context on a sustainable and repeatable basis, which entails incorporating the error into future decisions in other contexts, regardless of information set the formula to calculate the Implicit Cost of Erroneous Information Context, which represents the relative trade-off between an error as determined by the Cost of the Error and the value of the sustainable, positive learning from the error as determined by the Value of the Error overall costs associated with an error as an embodiment of the invention:

$$C_{ei} = C_t + C_m + C_r - V_k - V_a - V_I$$

where $C_t$=costs associated with the time required to come to the erroneous decision $C_m$=costs associated with the mis-diagnosis, mis-classification, and/or mis-estimation of data in the process of developing understanding, knowledge, and intuition with regard to information analysis $C_r$=costs associated with the repair or otherwise corrections to remove erroneous information contexts from the user's and/or the System's knowledge base within an information set $V_k$=value obtained via the understanding and knowledge inherent in the discovery, understanding, and incorporation of the error in the decision process, which entails finding and understanding the error $V_a$=value of the ability of the decision to be incorporated into the knowledge base for the user's and/or System's use within the specific context and information set, which entails incorporating the error into future decisions in the same context $V_I$=value implicit in the user's and/or System's incorporation of the error as learning into a greater context on a sustainable and repeatable basis, which entails incorporating the error into future decisions in other contexts, regardless of information set or, substituting the Cost of an Error and Value of an Error into the formula for calculating the Implicit Cost of Erroneous Information we have a simplistic form based on error costs less sustainable learning as an embodiment of the invention as follows:

$$C_{ei} = C_e - V_e$$

the concept of Information Sunk Cost, which represents the logical information costs implicitly required in any interaction with data from an intellectual (if user) and/or processing (if System) basis as an embodiment of the invention.

the formula for calculating the Information Sunk Cost of Data Interactions in the Information Research, Analysis, and Decision process, which involves determining/calculating/deriving the logical information costs inherent in any data interaction as an embodiment of the invention:

$$C_s = (C_p + C_k)*C_t + C_e - V_e - V_a$$

where, $C_s$=the Sunk Cost of Data Interactions in the Information Research, Analysis, and Decision process $C_p$=costs associated with processing the data, or conceptually, the logical costs associated with identifying the data component as relevant/not relevant $C_k$=costs associated with assimilating the data into the knowledge of the user and/or System $C_t$=costs associated with the time and resources required by Cp and Ck $C_e$=costs associated with an error in the decision process $V_e$=value obtained via the understanding of the error in the decision process $V_a$=value of the ability of the decision to be incorporated into the knowledge base the concept of Information Transaction to represent the user's and/or System's interaction with a data component. This interaction carries a logical data cost in the process of obtaining understanding, building knowledge, and forming intuition used as part of the information research, analysis, and decision process as referenced in the calculation of Information Sunk Cost as an embodiment of the invention.

Gravity, a mechanism used to determine the relationship between two or more information components based on one or more common characteristics as an embodiment of the invention.

Logical Positioning Magnetism, a mechanism that provides a user with the ability to enable a different "attractor" within an Information Experience that will highlight, identify, and/or otherwise visually reference those characteristics meeting the attraction requirements. For example, contexts such as profitable, growing faster than 30% Y/Y, and friend contacted most often could be conceptually valuable if as the user moves through the system, the level of attraction based on these specific "settings" revealed the changing relationship values (gravitational attraction), absolute values meeting a threshold, etc. in a manner understood by the user. An analogy of information context as used in research and analysis as an embodiment of the invention is of walking through a store with a powerful magnet that could have its magnetism changed at the holder's discretion to attract only those materials desired. For example, changing a dial from "metal" to "wood", "plastic", or other material based on the actual or potential characteristics desired is also relevant as an information user seeks. Additionally, the holder would be able to change within a specific characteristic to only attract those specific characteristics of characteristics desired such as "flat metal" to "cubed metal" and further qualified with "cold flat metal" by adding another level of depth, or context, which would be bound only by the levels of context identified for a specific Information Experience Context Index, a mechanism to capture the context within an Information Set that may be of greater value as a thematic, group, or other thesis, a set of specific, Logical Information Assets, or other grouping rationale such as used in ETFs or investment indices in the investment Information Set that are used to provide a contextual reference for a user's understanding of information in context as an embodiment of the invention.

Contextual Experience, which enables the process of modeling information based on context as an embodiment of the invention. The invention acts as the first information analysis system in the field of investment assets that turns data into information through the use of contexts. The System seeks to qualify and quantify information in context for the user and for a better understanding of how users' contexts relate, diverge, etc. for benchmarking, learning, and improving the ability to identify, capture, associate, qualify, and quantify the data as information in context. Additionally, The System is intended to use the patterns inherent in information contexts contributed by unique users to provide a more detailed understanding of the use and value the information as relevant for decisions, knowledge, and a deeper and true understanding.

Context Profiles—Context Profiles are profiles that are unique to each information asset in The System. The information asset contains information specific to that asset's characteristics and preferences as determined within The System. Chief among the Context Profiles is that of The System User ("User"). When A User logs into The System for the first time the User will be prompted to walk through a series of questions that enable The System to put contexts around the User Asset such that the User's preferences, characteristics, history, decisions, analysis, and other uses of The System are maintained in a manner that The System uses to provide "intelligence" to the User throughout the User's experience in The System. Additionally, The System seeks to build Context Profile understandings based on the analysis of Users in The System to identify usage, build potential patterns of interest to a specific and/or group of Users, and to maintain benchmarks, best practices, and other System-related information of value to The System populace.

Context-Building, otherwise known as the process by which The System captures information in context based on the particular information assets that the user accesses, including details such as duration, purpose, inputs, outputs, thoughts, notes, etc. As the user continues to use The System, The System will assist the user in refining her/his context patterns over time and should be able to determine expected contextual determinations for a user based on her/his Context Profile. Further, this knowledge and understanding will enable those with similar context profiles to lessen the learning curve associated with information in context.

Context Data Storage, by which The System is designed with the goal of enabling greater understanding with regard to information, decisions, and knowledge in context. As such, the most important components of The System's brain include those that identify, house, organize, analyze, decide, refine, enhance, expand, and manage contexts. The System is designed to deduce a pattern from the data, information, and information in context. Specifically, The System identifies both factual and opinionated components. The System attempts to reproduce the user's intended meaning by combining the components in a manner that works to gather based on patterns the intended meaning from that user's perspective and based on data components specific to the statement such as actor, action, facts, opinions, information, information and general data components such as date, time, metadata, and recent work, in context such as Facts, Information Asset, Research, Analysis, Opinion, Decision, Timing, Action. Ideally, The System is designed to be an information-based view of real-life with relevance to each specific user. The System translates data combined with associated context into relevant contexts, which are encapsulated within information assets. For example, when analyzing any piece of data, information, or context, unless System-supplied, the context will always include the user involved in the asset context. In this way, different users with differing points of view may be components of context within an information asset. The information asset represents the container that houses contexts related to the information within and associated with the assets. Essentially, information assets are stored as logical groupings based on contexts. Additionally, the ability to maintain a historical record of the data, information, and information in context that has helped define the contexts is largely achieved through System-generated "mappings" of data, information, and information in context as well as with the specific storage of those components of the context-building process used to arrive to the data. However, unless stated otherwise, the user-specific data, information, metadata, etc. is not available to be known to or accessed by any other users except for The System itself. Importantly, The System uses this information only to enable more complex analyses of each user's knowledge, understanding, and use to create contextual patterns that are worked into System-supplied data, information, and information in context. It is important to note that The System-supplied data such as user, investment holding, and personal data for example used in these System functions are not accessible by any system users except to the extent that the users are made aware that their contextual patterns et al are to be combined with those of others' to determine relevant views, benchmarks, and best-practices understandings in an effort to contribute to The System's intuition and ability to capture the essence of these information in contexts.

Contextual Information Analysis Engine, where The System seeks to replicate the capability inherent in a person's ability to reason when the following hold true with regard to the person: 1) He or she maintains experience and/or expertise that is relevant to creating an understanding of a relevant piece of information around data, whether actual or perceived, physical or logical, factual or opinionated; 2) He or she holds knowledge and expectations about one or more items of data that can be thoughtfully and relevantly applied to the analysis of data; 3) He or she understands at least one component of the overall context in which the data exists; and 4) He or she is able to use the capabilities established in the first three to convert the data into information, which can be used to make a decision based on an informed understanding of the appropriate context. Specifically, The System takes in data and/or information ("inputs") and creates connections with, between, and among the inputs to achieve one or more contexts.

EXES represents the packaging of characteristics in an Experience. They essentially replace the traditional axes in a three-dimensional spatial model of data with characteristics specific to an Experience. The nature of the different characteristics in data, information, and contexts, and the different value of each of these to each user require the ability to shift thought from the concept of three spatial dimensions to the thought of characterizations, which just happen to occur across the three spatial dimensions. For every experience, there are three EXES (EXIS, not EXES, is the name of each specific x, y, or z "axis equivalent"), which replace the x, y, and z axes, with which the user defines the characterization of the combined contexts as seen by being laid out spatially. This packaging of the characteristics into a bundled context scenario enables portability of context, information sharing such as through best practices, benchmarks, and collaboration, and provides a quick and intuitive manner for users to see how others are viewing the same information, to compare the value with their own contextual models and understanding, and for System-wide identification of potential contexts of interest to the user-base at large.

Logical Information Gravity Model, which demonstrates that just as within physics, information holds to many of the same ideals. Information can be structured and modeled with physical property equivalents in an effort to define the research and analysis of information in a new and novel way, based on the learning of existing models of the universe, gravity, matter, etc., which are more complex and dynamic than that of the financial markets. There are numerous similarities including attraction, clustering, coalescence, etc., that have natural equivalents. the concept of Information Universe (Universe), defined as the set of data, information, and contexts specific to the understanding of a specific topic or subject of information analysis.

The concept of Information in Context, defined as the application of specific qualifications to data, information, and contexts to enable a deeper, more meaningful, and specific understanding of the Information Universe.

The concept of Information Value (IV), defined as the determination of value based on one or more data, the user's perception of relative importance, and the user's assessment of the values assessed for Information Value and Relevance Value of information in a Universe.

Context Qualifications System, a mechanism that provides quantifiable characteristics for qualitative associations of the user's knowledge and experience with information as it relates to the user's User Profile in The System. The Context Scale is a qualitative assessment of a user's understanding and ability to provide meaningfully relevant context to information throughout its analysis. Specifically, the user's ability to separate the information from noise, or non-information masquerading as information, can lead to time, understanding, and processing advantages for the more capable. As such, The System is designed to ask the user to rate her/his self on this characteristic (Context Scale) and will follow with "learning" over time. Once the qualitative assessment has been rendered, The System will provide a quantifiable metric, or Context Score, according to the scale (below), which provides a confidence level for the context based only on that information in that specific context. Additionally, The System will maintain an updated accounting of the user's Context Score to be associated with each user's User Profile as an updated, overall representation of that user's experience and knowledge with the information specific to a set of data, information, and context.

The concept of Information Context Value ($IC_v$), defined by representing the importance of specific Information Context, analogous to the concept of gravitational force in physics. The System does this for each and every Information Asset in the specific Information Universe by identifying the weighted impact of information in context relative to other objects in the information system, thereby, identifying a representative value for the information in a value context. $IC_v$ is a quantified unit of measure that provides an understanding of the nature and enables an Experience of Information Assets' behaviors based on qualitative and quantitative inputs, which can be subjective and/or objective in nature, defined as characteristics of assets, or Information Contexts (Contexts). As a requirement in the information analysis process, understanding of the data, information, and contexts together provides meaningful inputs to the evaluation of information.

Information Relevance Gravities, which represent the relevance and importance of the components of one or more information assets as determined by context Information Value Gravities, which represent the relevance and importance of the components of one or more information assets as determined by context as determined by values attached to each context component.

Information Positional Gravities, which represent the relevance and importance of the components of one or more information assets as determined by context but as determined by the other information assets in the information system Information Weight Gravities, which represent the relevance and importance of the components of one or more information assets as determined by context as determined by scaling mechanisms such as the Context Scoring mechanism, Context Qualifier Scoring mechanism, Visionay Scoring mechanism, Management Scoring mechanism, or other system-generated or user-defined scaling and/or scoring mechanism used to create context with information.

Relative Option Scale, a mechanism utilized to depict the user's associated contextual value of information as plotted relatively within a scaling mechanism to enable the calculation or derivation of a quantity used to represent this association. There are many forms of this model including Uniform, Non-uniform, Biased, Non-biased, and many 3-dimensional implementations of this concept to capture context values in scale. (see FIG. A3)

Information Value Density, a mechanism that enables the value of information to be measured conceptually as a "tug-of-war" between two decision outcomes by calculating each outcome's specific volume per unit of mass as shown in the graphic below and as embodied in the invention. For example, the if it is assumed that a "sliding" scale with finite boundaries represents the whole, or 100%, of the decision outcomes, then the relative value of each outcome can be determined based on an assumption of objects representing equal mass but unequal volumes (as specific information context characteristics) as depicted in the graphic below the concept of General Information Context (General Context) to represent context within the system that is system-wide, information set-wide, or applies to information assets within the highest level of information analysis for the information set. Examples include time, date, etc. that could exist in this and other software systems. Additionally, system-specific information assets, concepts, metadata that cannot exist in another software system also fall under this category for a system user as these would represent the context at the highest layer of information, the system-wide layer.

the concept of Non-specific Information Context (Non-specific Context) to represent any context that is "shared" among information assets but is specific to that group of assets and/or cannot be specifically related only to one information asset within the group would be considered non-specific context. This provides for a logical group's recognition of specific context associated with the information assets within the group, and for the information assets themselves to inherit the logical grouping's implement of the specific asset, but only the non-specific context is encapsulated specifically within each of the information assets within the logical grouping information asset. For example, as in programming, the sub-class can inherit an implementation method from its parent class, but the implementation method specific to the information asset is only that which is unique to that class. Another example from business would include a group of competitors (information assets) within a specific industry (logical group) that each would share the characteristics contexts associated with the industry itself such as "revenue growth" or the "industry's customer base", but would maintain their own "identities" and "versions" of the revenue growth and "company" customer base as Specific context.

Information Experience Environment, or "Experience Environment", a mechanism to depict the combination of "mechanical", logical, visual, objects, and calculations and other components programmatically utilized within the system to enable the visual understanding and intuition of information.

the concept of Information Asset Object, which represents a component of data, information, and/or context, in while or in part, that can be a visual or conceptual object, and object used to facilitate, or a sub-component of the derivations and/or creation of one or more Information Asset Objects as Experienced visually within an Information Experience.

Information Context Center of Gravity, a mechanism to depict the center of an Information Experience's center of Information Value Gravity as calculated and determined based on calculations, the characteristics defining the EXES, or 3-dimensional "layout" of the Information Experience, effectively to determine the exact coordinate around which the Experienced Information's Information Mass is equally distributed at an exact moment of reference.

Information Context Accrual, a mechanism to generate the value of information and context with regard to an Information Decision. There are three primary forms of this model:

Comprehensive, includes the complete set of Information Assets associated with a specific information set, a specific user, and one or more specific Information Context Layers Semi-Comprehensive, involves the incorporation of more than one and up to, but excluding the Comprehensive Form, of any number of Information Assets associated with a specific information set, a specific user, and one or more specific Information Context Layers Simple, the utilization of one specific Information Asset associated with a specific information set, a specific user, and one or more specific Information Context Layers Information Context Scale, a mechanism to depict the conceptual allocation of a decision based on the value of the information in a specific user context as conceptually presented. (see FIG. A2)

the Information Decision Context Scale, a mechanism utilized to depict the value of information in a specific user context based on a user's subjective, or the System's calculation of value as plotted on a scale indicating position as it relates to the polar characteristics of the Information Context Scale. The scale exists in many forms, including: Biased; Non-biased, Percentage, and among many 3-Dimensional Object forms (see FIG. A4).

The concepts of Relative Options Scale and Information Decision Context Scale each provide for the "charged" status of information context conveyed by the user. This is important because with the attraction and repulsion of charged particles within a magnetic field as identified in the concept of electromagnetism, the positive or negative charges of Information Assets can also be used to create context within an Information Experience in similar manners. The system incorporates the ability to provide Information Experiences containing the Information Attraction and Information Repulsion properties, which enable an understanding of information components as components in an information analysis relationship, behavior, and/or state, among other utility.

Information Context Qualification Cycle, represents depict the accuracy of context associations with information as determined based on a system-generated assessment of a user's knowledge, experience, and usage of the information and based on usage and associations patterns of other users of the same information in a similar manner. Specifically, this can be implemented as a statistical mechanism such as a normal distribution within the System to help determine usage patterns and to provide the System's understanding of specific user biases.

Information Context Strength, a mechanism utilized to ascertain the "strength" of context as intended by the user to represent the context as one or specific variations of emphasis on the information. For example, a context strength would be higher when the user places a heavier weight, relevance level, level of importance, or value on an Information Context Component either explicitly or implicitly, based on the user's usage patterns or the patterns of other users of the same information with similar usage patterns.

Information Context Pattern Analysis, a mechanism utilized to "map" the logical information associations of a user to specific patterns in an effort to determine likely future uses of similar information and to enable contexts useable, understandable, and/or available to other users and the system at large to enable the improvement of information understanding, fuel other context associations and patterns, and to reduce a user's learning curve associated with the information. The mechanism employs scales, calculations, associations, and other ways to derive logical patterns of use that are determined as "likely matches" based on calculations of relationships, Predictive Informational Power, and other General, Non-specific, and Specific Contexts, among other components.

Information Experience Distance, a mechanism utilized to depict the visually-observable distance between two coordinate points of reference, which represent the centers of gravity for two Information Assets within an Information Experience, and as calculated based on System concepts.

Information Experience Momentum, a mechanism to depict the visually-observable trend of movement within an Information Experience as calculated based on Information Mass and Information Velocity in the System.

Logical Information Context Bias the process for determining Bias and Non-bias Information Context by implementing a decision analysis tool that through a series of Information Decision Contexts determines whether the information under analysis requires and/or is optimized using directional or non-direction scaling mechanisms. Specifically, the system requires a determination of Charged or Charge-less. This mechanism requests input as to the nature of the information analysis outcome as determined based on direction or magnitude or both, and on the state of the Experience, or movement capabilities as reflected in a time-series analysis.

Relative Decision Competitors Context, a mechanism to capture the relative decision options available in a decision based on a scaling or other mechanism.

Information Context Conversion, a mechanism utilized to provide an EXES with "characteristics scale" appropriate to enhance information analysis with experience as embodied within the invention.

Information Context Translation, a mechanism utilized to translate information context, whether qualitative or quantitative, into Information Scores and/or Information Values, and to enable the translation of Information Scores into Information Values and vice-versa as embodied within the invention.

Information Context Layer, a mechanism depicting a "level" of information contained within an Information Asset and depicted in an Experience as a series of concentric objects, each holding a different context component, which when viewed in total, provides the user with visually understandable context to the information as embodied within the invention.

Information Context Experience, a mechanism specifically designed to depict the information contexts within a larger Information Asset, including information decision and information processes, among other applications as embodied within the invention.

Experience Power, a mechanism to depict the value of information in one Information Asset (information component such as data, information, and/or context; information decision context, information quantities, information qualities, and information qualifications represented quantitatively) as it relates to the explanatory capability, real or perceived, of the overall information Experience.

Information Gravitation, a mechanism to represent the value of information in context in a logical grouping, an Information Asset, which can be visual Experienced in the system, and also can be used in calculations of relationships and Experience Power among other applications. Information Gravitational Scale, Information Gravitational Quadrants, Gravitation Information the formula for calculating the Information Context Score Value, which represents the assessed value of information in context Information Input Score Calculation Context Mapping, as the process of creating context maps of data, information, and context in an effort to improve system performance and lessen storage concerns.

Information Attraction, a mechanism that explains the interactions and relationships/connections exiting between/among information assets within the system.

Information Traffic Context Management, a mechanism designed to support the effective usage of data, information, and contexts in real or logical systems as depicted in the system.

General Form of Information Displacement Volatility, a mechanism used to determine a form of volatility inherent in information by analyzing from within an Experience the spatial distance from the origin and the path utilized to get there given data plotted on a 3-dimensional graph using Cartesian coordinates by calculating the amount of distance per displacement.

he formula to calculate a form of information volatility based on one or more data points and a logical path used to determine a distance from the origin, Volatility Displacement (VTd) as $$IVLT_D \frac{I_d}{I_D}$$

where

IVLTD=General Form of Information Displacement Volatility
Id=distance from the origin
ID=displacement relative to origin Information Distance Volatility, a mechanism used to determine a form of volatility inherent in information by analyzing the spatial distance from the origin and the path utilized to get there given data plotted on a 3-dimensional graph using Cartesian coordinates by calculating the amount of displacement per distance.

the formula to calculate a form of information volatility based on one or more data points and a logical path distance used to determine a displacement from the origin, Information Distance Volatility (VTd) as $$IVLT_D \frac{I_D}{I_d}$$

where

IVLTd=Information Distance Volatility
Id=distance from the origin
ID=displacement relative to origin EXES point, or EXEP, which represents the conceptual location of a set of three characteristics as plotted within a Cartesian Coordinates system or within an EXES as defined in the system. Specifically, this replaces the data point in a traditional Cartesian plot within the system by utilizing multi-scaled, multi-type, and varying scales within the same Experience to provide context to qualitative and quantitative information. An EXEP is designed to provide relative frames of references contexts for the user regardless of the underlying absolute values, data types et al used to create and define an Experience within the system EXEP=(x, y, z) as plotted in an EXES within an Experience EXES Qualifier, or EXEQ, a mechanism to denote a set of one or more values, weights, relevance levels, or other ways of qualifying one or more specific data points to be plotted based on information in context within the system EXEQ=[a, b, c] as a set of values that apply specifically to the values in an EXEP.

the symbol for an EXEP, a specific 3-dimensional coordinate point in an EXES as

<^> when typed from the keyboard or graphically as an object in the system as

<^> the EXESPQ, a mechanism to denote the conceptual notation utilized used to signify the plotting of an EXEP within an Experience as quantitatively qualified in the form of (x, y, z)<^>[a, b, c]

where x, y, and z represent the 3 data points in a Cartesian Coordinates System or in an EXES a, b, and c represent Context Qualifiers, which are independently applied to the respective positions of the data points in the same positional order in the EXEP, or (x, y, z)

EXEQp, and Qp, two forms of one mechanism that denote the specific association of one or more Context Qualifiers with a specific data point in an EXEP noted by the specific data point and associated qualifiers as EXEQp=Qp=EXEPi[j1, j2, . . . , jn]

where EXEPi represents a specific data point in the EXEP j represents Context Qualifiers to be associated with the specific data point n represents the Context Qualifier value at position n Multi-contextual EXEQ, or EXEQm, a mechanism to denote the multiple values that represent associated components of context for one or more values in the EXEP within the system and noted as EXEQm=[a[a1, a2, . . . an], b[b1, b2, . . . bn], c[a1, c2, . . . cn]]

where n=the Context Qualifier value at position n the formula to calculate the Average Context Qualifier value, QA, as embodied within the invention.

$$Q_A = \frac{j_1 + j_2 + \ldots + j_n}{n}$$

where j=the specific value of the Context Qualifier at position n n=the numerical count of Context Qualifiers the formula to calculate the Weighted Average Context Qualifier value, QWA, as embodied within the invention.

$$Q_{WA} = \frac{(j_1*(1+w_1)) + (j_2*(1+w_2)) + \ldots + (j_n*(1+w_n))}{n}$$

where j=the specific value of the Context Qualifier at position n w=the specific percentage value of the weighting at position n n=the numerical count of Context Qualifiers Coordinate Qualifier, or QC, a mechanism used to determine the importance, relative relevance, value, and/or weight of a specific data point within a coordinate point relative to the other points in the system used to identify the spatial positioning of an information asset. This system builds off of a coordinate point with an added Context Qualifier notation that is either user-provided or system-generated context applied to one or more data points in the coordinate point and is denoted in the following form Specific Form of Displacement Volatility, a mechanism used to determine Specific Form of Distance Volatility, a mechanism used to determine claim Information Decision Effectiveness Cycle, a mechanism depicting the stages of execution involved in the use of information to make decisions that result in an increased value of the information.

The concepts of General Thematic Power (GTP) and Special Thematic Power (STP). The General Thematic Power and Specific Thematic Power concepts represent the overall ability of a theme to continue providing tailwinds for investments and to determine the specific power of one group, company, etc. to exert influence over its strength, resilience, and direction within the industry domain (Competitiveness, Competencies, and the thematic Reality & Perception) For example: Hypothetically, if industry competitors, buyers, and trade pundits took a survey on each player in the industry, theme, etc. and collectively ranked the score for each company, theme, etc. how does everything shake out). I would then also consider the same "hypothetical survey" within the investment community to determine the power of the opportunity as an investment. I will look to those areas most positively reinforced by a thematic overlay, but it is a focus tool and not an decision-maker.

The concept of CONTEXTassociations, which identifies the way by which information contexts are/can be associated with data, information, and other contexts to provide greater understanding of information under analysis VALUATIONgravity, a mechanism that captures the inner and outer forces constantly at play on stocks and presents them as valueSpheres in a VALUATIONsystem (components of my VALUEgravity modeling theory, which states that an asset's value is determined by the asset's net asset value presuming liquidation+the core asset value of an asset, (as a group of internal, entity-controllable components and resources working productively and largely pushing outward from the center; includes actionable, quantifiable, and qualified items such as strategy, management competencies, skills, and decisions, employee-related items, Operating items skills: R&D, Sales, Efficiency, BS strength such as financial flexibility, cash on hand, etc.)+an entity's competitive advantages (based on the strength, timing, and flexibility with the underlying entity-controllable items) as a layer, "skin," or "atmosphere" that provides protection against the externalities–external forces acting on (pushing inward on) the valueSphere from items such as competitors, macro, environment, geo-political, economic conditions.

CONTEXTmanagement, a mechanism which provides a new context for evaluating a management team's ability to execute and including a "grade" that is embedded within the asset.

This system provides a theorized model process for monitoring, capturing, scoring, and including execution context and the asset's management team's decisions into the decision-making process through a 4-step, subjective, cyclical process: Know, Say, Do, Show, determined based on each individual's (or investment team's) user-defined answers to 4 simple questions.

KNOW: Does the management team KNOW what they are supposed to do? This subjective question forces the research to take in the user's opinion of how well the management team has picked the "right" strategy. Perhaps the most subjective of the four, this question may be answered incorrectly by the analyst/user.

SAY: Does the management team clearly SAY what they know they have to do to enhance/stabilize (from free-fall) the company's value? This is basic expectations management and without proper management of consensus expectations, a management team will have little control over stock reactions to company strategy, tactics, actions, and performance. With successful expectations management, the management team appears well-understood and is less likely to experience "gray areas" among investors, buy-side and especially the sell-side communities. Confusion in message can create a terrible environment for investors as the more interpretations of what needs to be done differ, the more likely the street will be divided in evaluating the stock's prospects. Therefore, a management team's control over the messaging of its results vs the expectations (Expectations Management Gap, or EMG) is almost as important as its ability to control its execution to achieve those results. Evidence of this can be seen for those stocks that have had relatively large EMGs, which leads to a broader Sell-side Expectations Opinions Range (SEOR). Additionally, the impact becomes apparent with a stock's reaction to its management team reporting results that are out of line with the consensus expectations and seem to have "surprised" the street. Therefore, it is imperative that the investment decision process include a thorough analysis of this context in order to grasp and possibly project, the value of any company event such as an earnings release, pre-announcement, etc. and to weight those factors objectively. This is also initial vision relay to stakeholders and contains the tactics necessary to execute the strategy.

DO: Does Management do what it says it knows it has to do? Essentially, to they follow through and remain accountable.

SHOW: Does management reinforce their follow-through with consistent messaging and actions around their strategy, tactics, etc. Again, the better informed stakeholders are, the better the stock should/will be appreciated in the market. This is where management can point to their vision, and convey well how execution on their strategy continues along the designed path.

the concept of CONTEXTcollaboration, which involves an Information Asset's ability to enable multiple users to enact changes, add to, and create more robust contexts around a single Information Asset.

Contextual Flow, a mechanism that seeks to capture the likely meaning of information given a specific set of characteristics and context, which when combined provide a 3-dimensional "landscape" by which the information's true context(s) can be derived. For example, if a user is analyzing technology sector investments and information contains reference to Storage, the Context Intuition Engine would capture the essence of the context by acknowledging the reference with quick reads of data, information, and contexts applied in Information Assets that reference the term "Storage", would increment each Information Asset it finds (in the Information Asset's metadata), and would pull Information Assets into cache to be depicted in the 3-dimensional Experience designed to depict Contextual Flow Contextual Map, a mechanism that seeks to create a well-identified map of data, its relation to information, and the building of information in context. For example, one conceptual embodiment of the invention with regard to this concept is of data (vs information) analysis, which is an alternative way of presenting keyword maps and/or "heat maps" of terms within data sets. For example, could replace each word in a document with a number representing the number of times it appears in a document. The value behind this concept is data storage, retrieval, and getting a sense for how the document is laid out. Additionally, it can serve to easily depict changes to/adjustments in data sets over time periods. The keywords could be weighted based on levels of importance as determined by The System and/or user and experienced as objects as would any other objects. "Filler" words such as "a", "the", etc. could be included for document-to-document analysis, but could be left out of relevant keyword experiences. Statements, phrases, etc. could be analyzed for patterns and experienced. For example, if an analysis of conference call transcripts among 10 companies shows "better than expected" appearing at least twice each, we would quickly be able to see these effects as they were visually presented in 3-D space based on characteristics desired (favorable, level of enthusiasm, statements vs the underlying data, etc.) From this, we could get a sense based on data of whether the company's statements matched their financial results and especially important, whether their statements and the data matched consensus expectations.

Informational Pull, a mechanism that determines the attraction that exists between 2 Information Assets based on 1 or more specific metrics, characteristics, and/or ideas.

And can calculate a stock's $LI_{Gravity}$ attraction relative to another stock by noting how much of a stock's issuing company's revenues are influenced by a relationship with the other stock.

TABLE 1

| IV Components | 833 Stock A IV | 836 Stock B IV |
| --- | --- | --- |
| Current Price | $25.00 | $32.50 |
| High Target Estimate Price | $51.00 | $37.50 |
| Historical high price | $32.00 | $85.00 |
| Low Target Estimate Price | $18.00 | $32.65 |
| Historical low price | $4.10 | $12.75 |
| Bias-charge | 1 | 1 |
| $LI_{Mass}$ | 25.702 | 27.155 |
| $LI_{Mass}$/Current Stock Price | 1.028 | 0.836 |
| $LI_{Bias}$ | 1 | 1 |
| Spatial Coordinates | | |
| P/E ratio | 12 | 12.5 |
| P/S ratio | 3 | 1.25 |

TABLE 1-continued

| IV Components | 833 Stock A IV | 836 Stock B IV |
| --- | --- | --- |
| Growth Rate | 0.4 | 0.08 |
| Plotted Coordinate | (15, 3, 0.4) | (12.5, 1.25, 0.08) |
| $LI_{Gravitational\ Force}$ | 229.1127 | |

In Table 1, Current Price represents the current price of stock

High Target Estimate Price represents the user's perceived high stock price for the stock Historical high price represents the stock's high price over its history Low Target Estimate Price represents the user's perceived low stock price for the stock Historical low price represents the stock's low price over its history Bias-charge represents the association of Information Value as a function of the direction of increases in the underlying data, which in the example of stock prices would be increases in stock prices represent increases in Information Value for investors with a long-oriented investment bias, or those investing with the intention of gaining from higher stock prices relative to a short-oriented investment bias in which an increase in stock prices represents a decrease in IV, thus, the Bias-charge is a function of the user's specific contexts with the information and the underlying data $LI_{Mass}$ represents the IV inherent in the IAO, which in this case represents the IV relative to the IV value itself with a basis in one or more stock prices, and in this example, presented as the sum of individual stock components represented as a weighted average value, but which may be overridden by explicit user input, or by inclusion of the traditional method as to set the stock $LI_{Mass}$ value=the $IV_i/IV_B$ $LI_{Mass}$/Current Stock Price represents the relationship between the $LI_{Mass}$ and the stock price, which as calculated as $LI_{Mass}$/current stock price derives a value based in average, but not specific value form and conveys the relative opportunity of a stock with a value greater than 1 represents better value than a stock with a value less than 1

$LI_{Bias}$ LIBias refers to the product of the two stock biases, each of which has a value of 1, which reflects a long-oriented investment bias Spatial Coordinates represents the Information Experience dimensional characteristics for visual output as in 122, 336, 1012, 1014, 1016, 1018, 1020, and 1042

P/E ratio represents a stock's current stock price divided by the stock's issuing company's earnings per share (EPS), which is a common metric used in the analysis of stock investments P/S ratio represents a stock's current stock price divided by the stock's issuing company's revenue per share (RPS), which is a common metric used in the analysis of stock investments Growth Rate represents the stock's issuing company's revenue growth rate on a year-over-year basis, a common convention used in the analysis of investments Plotted Coordinate represents the three spatial characteristics chosen by the user for the purposes of visual output in an Information Experience as in 122, 336, and 1042

$LI_{Gravitational\ Force}$ represents the relationship of the two stocks based on the LIMass as a function of IV and as calculated as $LI_{Bias1,2} * LI_{Mass1} * LI_{Mass2}/(d^2)$, where $LI_{Bias1,2}$=the average bias present in the two stocks as determined by their individual biases ($LI_{Bias}$), $LI_{Mass1}$=the $LI_{Mass}$ of stock 1, $LI_{Mass2}$=the $LI_{Mass}$ of stock 2, d=the distance between the two stock IAOs as plotted at a coordinate determined by the EXES characteristics of $EXIS_1$, $EXIS_2$, $EXIS_3$.

Information Context Connector, a mechanism representing references between/among 2 or more Information Asset Objects to denote some commonality and or connection. This can be used to denote the movement of one or more objects (tails) over time or can be used to represent relationships among Information Asset Components, and/or Information Assets, themes, and other Information Experience objects.

The concept of Default Information Contexts, which assign different scores to a group of characteristics across "default" information usage patterns implemented in the system to provide a quantitative differentiation component; For example, as specifically applied to investment styles such as "growth", "value", or "quantitative."

Logical Information Magnetism Information Assets, which represents the gravitational attraction or repulsion derived from a logical information relationship to one or more Information Assets in a form analogous to a magnetic field in our scientific view of the real world. For example, an Information Asset with a denser, "iron-like" core may be used in an Experience to provide relatively greater lift than the others based on the concept of a magnetic field. For example, creating a magnetic field simulation in an experience would enable the "repulsion" of the heavier items "away" with a calculated direction and magnitude based on information context patterns of usage that could conceptually "push upward and outward" (attracted more by the magnetic field's tendency to "push" objects up through the middle.

The primary goal of any productive value creation, analysis, and opportunity research and analysis toolset is to uncover and capitalize on the drivers of value, with specific note of the context involved. The process as designed is to maximize systematically the knowledge, understanding, and eventual intuition available to one or more users in a manner that would effectively equate to a person having significant experience with the information. Thus, the conceptual components most crucial to meeting this objective are based on a user's very real understanding and experience with the Information Set, the objective knowledge and experience of the user her/himself (self-aware and willing and able to be critical to create an accurate depiction), the user's ability to separate information from noise in data, and the ability to provide the relevant and effective contexts to any number of data, information, and/or contexts to create an overall intuition that enables greater decision accuracy, consistency, and speed. The capture the essence of information decision value for any decision maker, including the user her/himself, the user understand 3 primary components about each facet of the research, analysis, decision, and actions processes including: Foundational Resources (what the decision maker has to work with); Fundamental Competencies (what the decision maker does well); Integrative Execution (how well the decision maker applies what she/he does well to what she/he has to work with). The conceptual value of the invention itself is based on its ability to enable greater Foundational Resources by incorporating contexts into information, improve Fundamental Competencies by providing patterns of successful decision processes while promoting best practices most useful to similar users and eschewing those patterns and/or practices determined to be less productive, and enable a more complete understanding of the user's ability to make effective decisions based on a combination of the two. Systematically, capturing the answers to these primary questions is accomplished many ways and in varying levels of details, and are specifically bound to a user, but can be brought out by patterns, logical groupings, and best practices/benchmarks specifically bound to contexts to ensure better, more effective decisions, reduce learning curves, and ensure accurate, consistent decisions regardless of contexts as an embodiment of the invention.

The purpose of the invention is to provide a revolutionary, fresh and new approach, which requires a new way of systematically "thinking" through information decisions, and associated software specifically designed for the incorporation of context into information to build understanding, knowledge, intuition, and expertise in a faster manner based on intuitive learning utilizing information visualization, which accelerates and improves understanding. Among many embodiments of the invention, the following are included:

information users to accelerate and more accurately take control of their rate of learning curve adoption quick, intuitive, and dynamic understandings of data as used to convey information logical and powerful research, analysis, and decisions capabilities the continual improvement of the repeatability of sound decisions while reducing the opportunities for poor decisions centralized repository of the meaning of information deduced, which is constantly refined and improved independent of a specific information set and specifically effective on one or more information sets determining, applying, and refining patterns that enhance the power of the research, analysis, and decision-making processes and that lead to understanding, knowledge, experience, and expertise independent autonomy of information recorded based on the contexts associated with data and information as perceived by a user in a specific research, analysis, and decisions environment based on that user's understanding, knowledge, experience, expertise, and intuition at that exact moment with the benefit for hind-sight on that and other users' experiences with similar data, information, and context within similar research, analysis, and decisions environments career management aids such as creating a more efficient mechanism to manage information- or user-specific information contexts such as earnings reports in the investment management information set, maintain ideas, track performance, compare w/peers and/or colleagues, and perform other user-specific duties as users determine their need and applicability creating an "always-on" systematic environment where individual contexts are monitored, managed, and utilized throughout the System to create a "universal" environment for one or more levels of one or more information sets.

Best practices and benchmarks improve effectiveness and efficiency based on shared learnings.

Self-Awareness

Ground-breaking technology built and designed from the ground up to facilitate the rapid and intuitive incorporation of information into a user's thought process and decisions more consistently and accurately Specifically, the software system is designed to facilitate these goals by gathering, organizing, and providing the data, information, background information, managing the understanding obtained from the research, analysis, and decisions experience for a specific user based on the user's implicit and explicit determinations, the implicit and explicit determinations of one or more other users of the information, patterns derived from the user's specific usage and/or one or more users' usage, which is continually refined as new insights are gleaned, serving as a reminder for prior and/or shared understandings within similar data, information, and contexts used to create the knowledge, experience, and intuition of a practiced user of the information, including the processes, trade-offs, outcomes, and helping to identify any patterns in any part of the process to create a more efficient and successful process in the future. Further, this assistance also includes serving as a preparatory tool for future research, analysis, and decisions by effectively capturing the essence of the user's thoughts, ideas, and decisions as primary component of information to the specific user, by institutionalizing each and every component of learning, understanding, knowledge, and intuition as would define the information wisdom that is obtained through the building of experience and expertise with the information. For example, within the investment management information set, periodic reporting of financial information during 4, quarterly investment "earnings seasons" each calendar or fiscal year are used as sources of information as part of the research, analysis, and decision-making processes. Enabling the "pre-preparation" of information based on the prior quarter's/ quarters' contexts, estimates, projections, and other components to be taken into account with the upcoming earnings season reports would improve an investment information user's preparation, ability to remain consistent, and judgments, and potentially ensure higher probabilities of successful use of the information in a timely manner on an ongoing basis. Additionally, not only is the information contexts relevant to the understanding, but also the visually intuitive approach employed yields more intuitive and faster incorporation of the new information into the user's understanding. Specifically, the user's use of information occurs somewhere in a cyclical framework that embodies the data gathering and recording, application of contexts, information building based on data and contexts plus prior understanding and knowledge of the information set, decision-making, decisions-analysis, outcomes analysis, improvements to the research, analysis, and/or decisions processes, intellectual incorporation of understanding into thoughts, ideas, and actions, or intellectual incorporation of understanding into thoughts, ideas, and actions as the institutionalization of understanding. Prior to, during, and after each reporting period, the user inputs (thoughts leading up to the company's report, quick understanding and visual intuition of the period report's alignment with expectations—user's, management's, and consensus, and the post-report evaluation) and not recreated every period. Additionally, The System is designed to provide intelligence and analytics around those components of the investment process that the analyst would normally course in the normal course of conducting her or his business. Among many potential applications to investment (and other) understanding, The System as designed and developed can be used as a user-defined research tool to aid with investment decisions (fundamentals-based) or black-box mechanism to act on specific contexts as they occur (automation) but always provides the capability to apply its functionality to past decisions and analysis (HISTORICAL), current ideas (CURRENT), thoughts, recommendations, actions, and post-action or future learning, analysis, and refinement based on actual versus expected results (POST). The System is also designed to learn from and present the user with those patterns that best represent the user's past actions based on contexts, to enable the user's effective implementation of those things done well, reducing those things done poorly, chiefly by providing a revolutionary visual experience. This experience provides the user with the ability to quickly and intuitively understand data as visual information with the inherent capability to move back and forth through time to learn from the contexts, situations, internalities, and externalities that may have, likely have, probably have, may not have had any impact on the results versus expectations. The System also provides a quick and easy mechanism to visualize those things the user does not feel have/have not/will/will not have impacted results in the past, currently, or going forward. The System also provides a mechanism to associate contexts with information assets, which contain the data as associated contexts.

In summary, the embodiments emphasize:

1 Information in Context: Mechanism to provide for the use of information in context, which is derived from user-specific opinions, thoughts, and other subjective assessments of data and information at a specific reference point in time and the user's specific state of information understanding and intuition represented as Information in Context. The context is quantified for purposes of relevant calculations as described herein.

2 Information Valuation: Mechanism designed to value any Information based on the combination of one or more data, metrics, information components, and characteristics, and information relevance and assessment confidence into a quantified information score or value, which enables calculations and integration capabilities, information comparability and experience consistency by using instant formulas, patterns of context-, user-, usage-, and Information Set-specific concepts, methodologies, and mechanisms 3 Information Integration: Mechanism designed to Quantify the Qualitative and to integrate the qualitative with the quantitative by implementing the Information Value capabilities in 2, above, to create quantified scores/values for subjective user-assessments of information and by employing scales, opportunity cycles, and explicit, absolute values among other methods of associating subjective assessments with scalar or vector quantities 4 Information Objects: Mechanism that utilizes instant formulas to enable identification, valuation, association, organization, and visualization of information as unique Information Assets Objects 5 Information Storage: Mechanism stores relative references, which are specific to each combination of period of data capture/reference, metric/data/value, Information Component, Information Asset, Information Asset Object parent, and Information Asset Object children utilizing a rolling percentage or prior recognized value approach in a process of "Contexting and Decontexting" values so that only relative references are maintained 6 Information Experiences: Information understanding and intuition via visualization using instant formulas, models, context, associations, and Information Assets in a spatially-distributed, 3-dimensional (can also be applied to 2-dimensional views of information) computer-rendered, object environment 7 Information Context Sharing, Collaboration, and Best-practices: Enables the enhancement of user experience by identifying patterns of context usage and application by user, logical group, or Information Asset Object, including Information Experiences 8 Information Context Management: Mechanism(s) enabling mapping of keywords, phrases, expressions, and values from among components of data, information, and user-specific opinions, interpretations, and understanding as Information Context (Keyword/phrase Maps, Intuition Engine, Intuition Processing, Context Maps), which provides for the association of specific contexts with users, information, and a reference medium called the Information Context Chart of Accounts [MAY BE GROUPED IN WITH item 7]

Figure 13:
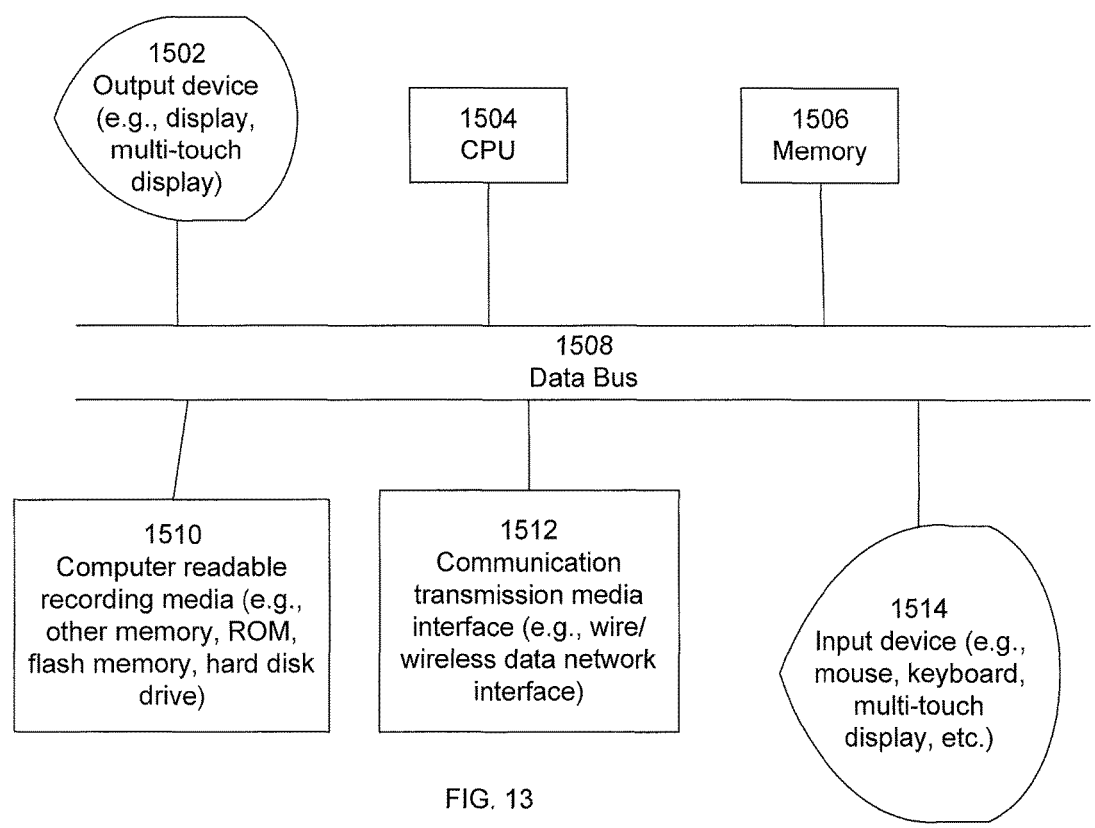
FIG. 13 is functional block diagram of a computer, which is a machine, for implementing embodiments of the present invention.

9 Information Security: Relative information stored as associated context relevant to each specific user provides lower value in theft, therefore, the concept naturally aids in information security and places less relative importance on the need for maintaining and securing general data FIG. 13 is a functional block diagram of a processing device, such as a computer (hardware computing/processing machine) for the embodiments of the invention.

According to an aspect of the embodiments of the invention, any combinations of one or more of the described features, functions, operations, and/or benefits can be provided. The word (prefix or suffix article) "a" refers to one or more including any combinations thereof. A combination can be any one of or a plurality. The embodiments can be implemented as an apparatus (a machine) that includes hardware for performing the described features, functions, operations, and/or benefits, for example, hardware to execute instructions or software, for example, computing hardware (i.e., computing apparatus), such as (in a non-limiting example) any computer or computer processor that can store, receive, retrieve, process and/or output data and/or communicate (network) with other computers. According to an aspect of an embodiment, the described features, functions, operations, data structures and/or benefits can be implemented by and/or use computing hardware and/or software. For example, a computing apparatus as illustrated in FIG. 13 can comprise a computing controller (CPU) or computing processing system (e.g., one or more processing devices (e.g., chipset(s), including memory, etc.) (e.g., a hardware logic circuitry based computer processor(s) that processes or executes instructions stored in the memory 1506, 1510, namely software/program) 1504, computer readable media 1510 (e.g., that stores information objects), transmission communication interface (network interface) 1512, input device 1514, and/or an output device 1502, for example, a display device, a printing device, and which are coupled (directly or indirectly) to each other, for example, can be in communication among each other through one or more data communication buses 1508. In addition, an apparatus can include one or more apparatuses in computer network communication with each other or other devices. In addition, a computer processor can refer to one or more computer processors in one or more apparatuses or any combinations of one or more computer processors and/or apparatuses. An aspect of an embodiment relates to causing and/or configuring one or more apparatuses and/or computer processors to execute the described operations. The results produced can be output to an output device, for example, displayed on the display. An apparatus, or device, or a computing or processing device, refers to a physical machine that performs operations, for example, a computer (physical computing hardware or machinery) that implement or is capable of executing instructions, for example, execute instructions by way of software, which is code executed by computing hardware including a programmable chip (chipset, computer processor, electronic component), and/or implement instructions by way of computing hardware (e.g., in circuitry, electronic components in integrated circuits, etc.)—collectively may be referred to as hardware processor(s), to achieve the functions or operations being described. The functions of embodiments described can be implemented in any type of apparatus that can execute instructions or code.

More particularly, programming or configuring or causing an apparatus or device, for example, a computer, to execute the described functions of embodiments of the invention creates a new machine where in case of a computer a general purpose computer in effect becomes a special purpose computer once it is programmed or configured or caused to perform particular functions of the embodiments of the invention pursuant to instructions from program software. According to an aspect of an embodiment, configuring an apparatus, device, computer processor, refers to such apparatus, device or computer processor programmed or controlled by software to execute the described functions.

A program/software implementing the embodiments may be recorded on a computer-readable media, e.g., a non-transitory or persistent computer-readable medium. Examples of the non-transitory computer-readable media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc-Read Only Memory), and a CD-R (Recordable)/RW. The program/software implementing the embodiments may be transmitted over a transmission communication path, e.g., a wire and/or a wireless network implemented via hardware. An example of communication media via which the program/software may be sent includes, for example, a non-transitory carrier-wave signal.

For example, according to an embodiment, non-transitory computer readable storage medium stores program(s), and computer hardware is configured, including configured by the program(s), to implement a context intuition engine and context valuation engine to perform the functions of 110, 112, 112, including 220, 222, 224, 226 and 230.

A method of analyzing data using a computer, comprising: executing by the computer: reading, from a non-transitory computer readable storage medium, an information component and calculating an information value for the information component; receiving a relevance value for the information value, the relevance value indicative of a user perception of relative importance of the information component; receiving a confidence value for the input value and relevance value; calculating a qualified information value according to the relevance value, the confidence value and a bias charge as qualifications for the information component value; and generating a visualization according to the calculated qualified information value. The bias charge is an alignment of the information value as it relates to the user's perception (perspective or viewpoint) of changes to the information value to influence the calculation of the qualified information value. An aspect of an embodiment involves adding multiple levels of qualifications to information according to a sequence of adding a relevance value, confidence value and a bias charge. The storage of information as an object and as a representation of the underlying data and characteristics as determined as depicted in 936 and according to the sequential calculation of a first set, or Comparative Set as depicted in 702, 704, 706, 708, and then as a Decision Set as depicted in FIG. 3A, 5A, 5B, 6, FIG. 7 (710, 712, 714, 716), FIG. 8, FIG. 11, and FIG. 12 with references maintained in an object and as context as in 206, 208, 338, 340, and 1028 and updated in 232, 234.

Information Valuation associates a value with data based on user-driven contexts and through an abstraction of data from its type, source or biases in a series of sequential steps as first, an input value is associated with a value that represents the input's value as a raw input, second, the input value associated to the input is associated with a relevance value, or a perceived level of importance for the input with regards to all other inputs under consideration, third, is provided and associated confidence value, or strength of conviction value, for each of the input and the relevance values associated with the input in the user's contexts, and then is aligned with the user's perception of bias in the input, which orients the user's perception with the underlying data in a manner that delivers a user-driven information value, and enabled for slight adjustment through the qualification of contexts as variables capturing subtle, yet insightful additions to the value of information, and finally, the resulting object with information value of which is stored in a manner based on the user's contexts as a related set of characteristics of the object and accessible as attributes in any manner of output and enables the consideration of information value consistent with the application of the process for other inputs that negates any perceived differences in data type, source, or other and effectively enables the user's allocations for those components above to determine the value of the input and includes: an information value calculation component configured to cause at least one processor to calculate the value of the information using scientific concepts and formulas; an information retrieval component that causes at least one processor to locate, recall, and/or update references that are/could be affiliated with the query based on logical groupings as determined by the user and patterns; an information storage component which causes at least one processor to enable the physical storage and logical associations identified in the process to be recalled in the future by the user and/or the system to determine usage patterns and experience levels with the information.

The many features and advantages of the invention are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A computer system, the computer system comprising:
   at least one processor; and
   at least one hardware storage device communicatively coupled to the at least one processor and storing instructions which when executed by the at least one processor control the at least one processor to,
      execute a process to generate a plurality of information objects (IOs), each IO indicative of a plurality of data points corresponding to an object among objects for which information in a first domain is obtained, a first IO among the plurality of IOs for a first object among the objects generated by,
         obtaining at least three first values of at least three first target data points by querying data, each first value indicative of a valuation metric for each first target data point,
         obtaining a plurality of second values indicative of first context data corresponding to the at least three first target data points, the plurality of second values including,
            a value indicative of a user context profile defining a use pattern of the user in a computer system performing a determination about the first object,
            a relevance value (RV) of each first target data point,
            a confidence value (CV) for each RV of each first target data point, and for each first target data point,
            a first bias value for each first target data point, and
            a second bias value,
         generating at least three first information components (ICs), each first IC including each first target data point and the corresponding first context data, and
         generating the first IO containing at least three first information values (IVs) corresponding to the at least three first IC, each IV generated based upon a product of each first target data point, RV, CV, and the first and second bias values;
      repeating execution of the process to generate a plurality of IOs to generate a second IO containing at least three second IVs for at least three second ICs for at least three second target data points for a second object for which information in the first domain is obtained; and
      perform at least one evaluation determination including,
         plotting the at least three first and second IVs of the first and second IOs in a three dimensional space based on a distance formula to represent a relative relationship indicative of relevance as gravitational forces between the first and second IOs, to control displaying a set of concentric spheres corresponding to the first and second IOs,
         each set of concentric spheres indicative of a gravity value (GV) based upon IVs contained in an IO to visually depict an outward or inward gravitational force indicative of relevance of the corresponding IV to another IV.

2. The computer system according to claim 1, wherein GV further indicates a relative relationship among the at least three IVs contained in an IO.

3. The computer system according to claim 2, wherein the at least three first and second IVs of the first and second IOs are plotted for a time period in the three dimensional space to visually depict in the time period an outward or inward gravitational force indicative of relevance of the corresponding IV to another IV.

4. The computer system according to claim 1, wherein the GV is generated based upon a sum of IVs of the ICs contained in an IO.

5. The computer system according to claim 1, wherein a concentric sphere in the set of concentric spheres is represented in form an amount of IV and a volume of information for an IO.

* * * * *